(12) United States Patent
Masurekar et al.

(10) Patent No.: US 11,502,958 B2
(45) Date of Patent: *Nov. 15, 2022

(54) AUTOMATIC CONFIGURATION OF LOGICAL ROUTERS ON EDGE NODES

(71) Applicant: Nicira, Inc., Palo Alto, CA (US)

(72) Inventors: Uday Masurekar, Sunnyvale, CA (US); Abhishek Goliya, Pune (IN); Minjal Agarwal, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,665

(22) Filed: Oct. 12, 2020

(65) Prior Publication Data

US 2021/0029040 A1    Jan. 28, 2021

Related U.S. Application Data

(63) Continuation of application No. 16/428,670, filed on May 31, 2019, now Pat. No. 10,805,220, which is a (Continued)

(30) Foreign Application Priority Data

Apr. 28, 2016 (IN) .............................. 201641014866

(51) Int. Cl.
*H04L 47/125* (2022.01)
*H04L 45/586* (2022.01)
(Continued)

(52) U.S. Cl.
CPC .......... *H04L 47/125* (2013.01); *H04L 45/586* (2013.01); *H04L 12/4641* (2013.01);
(Continued)

(58) Field of Classification Search
CPC ... H04L 47/122; H04L 47/125; H04L 45/586; H04L 47/783; H04L 63/0263;
(Continued)

(56) References Cited

U.S. PATENT DOCUMENTS 5,504,921 A    4/1996 Dev et al.
5,550,816 A    8/1996 Hardwick et al.
(Continued)

FOREIGN PATENT DOCUMENTS

CN    101018159 A    8/2007
CN    101442442 A    5/2009
(Continued)

OTHER PUBLICATIONS

Caesar, Matthew, et al., "Design and Implementation of a Routing Control Platform," NSDI '05: 2nd Symposium on Networked Systems Design & Implementation, Apr. 2005, 14 pages, Usenix Association.
(Continued)

*Primary Examiner* — Brian T O Connor
(74) *Attorney, Agent, or Firm* — Adeli LLP

(57) ABSTRACT

Some embodiments provide a method or tool for automatically configuring a logical router on one or more edge nodes of an edge cluster (e.g., in a hosting system such as a datacenter). The method of some embodiments configures the logical router on the edge nodes based on a configuration policy that dictates the selection method of the edge nodes. In some embodiments, an edge cluster includes several edge nodes (e.g., gateway machines), through which one or more logical networks connect to external networks (e.g., external logical and/or physical networks). In some embodiments, the configured logical router connects a logical network to an external network through the edge nodes.

19 Claims, 14 Drawing Sheets

Related U.S. Application Data continuation of application No. 15/420,043, filed on Jan. 30, 2017, now Pat. No. 10,333,849.

(51) Int. Cl.
  *H04L 41/0893* (2022.01)
  *H04L 9/40* (2022.01)
  *H04L 47/783* (2022.01)
  *H04L 45/64* (2022.01)
  *H04L 45/745* (2022.01)
  *H04L 12/46* (2006.01)

(52) U.S. Cl.
  CPC .......... *H04L 41/0893* (2013.01); *H04L 45/64* (2013.01); *H04L 45/745* (2013.01); *H04L 47/783* (2013.01); *H04L 63/0218* (2013.01); *H04L 63/0227* (2013.01); *H04L 63/0263* (2013.01)

(58) Field of Classification Search
  CPC ............. H04L 63/0218; H04L 63/0227; H04L 41/0893; H04L 45/04; H04L 45/64; H04L 45/745; H04L 12/4641
  See application file for complete search history.

(56) References Cited

U.S. PATENT DOCUMENTS

| | | |
|---|---|---|
| 5,751,967 A | 5/1998 | Raab et al. |
| 6,006,275 A | 12/1999 | Picazo et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,754,220 B1 | 6/2004 | Lamberton et al. |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,152,179 B1 | 12/2006 | Critchfield |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,428,220 B1 | 9/2008 | Caronni et al. |
| 7,450,498 B2 | 11/2008 | Golia et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,519,734 B1 | 4/2009 | Dumitriu et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,647,426 B2 | 1/2010 | Patel et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 3,014,278 A1 | 9/2011 | Subramanian et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,218,454 B2 | 7/2012 | Hajiaghayi et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,762,507 B1 | 6/2014 | Ingram et al. |
| 8,775,599 B2 | 7/2014 | Bansal et al. |
| 8,902,743 B2 | 12/2014 | Greenberg et al. |
| 8,904,028 B2 | 12/2014 | Iannaccone et al. |
| 8,958,298 B2 | 2/2015 | Zhang et al. |
| 8,997,094 B2 | 3/2015 | Bosch et al. |
| 9,059,999 B2 | 6/2015 | Koponen et al. |
| 9,201,837 B2 | 12/2015 | Egi et al. |
| 9,203,703 B2 | 12/2015 | Koponen et al. |
| 9,225,597 B2 | 12/2015 | Tubaltsev et al. |
| 9,270,581 B2 | 2/2016 | Guellal et al. |
| 9,450,852 B1 | 9/2016 | Chen et al. |
| 9,503,371 B2 | 11/2016 | Thakkar et al. |
| 9,577,845 B2 | 2/2017 | Thakkar et al. |
| 9,590,901 B2 | 3/2017 | Tubaltsev et al. |
| 9,762,537 B1 | 9/2017 | Eyada |
| 9,900,224 B2 | 2/2018 | Dumitriu et al. |
| 10,003,534 B2 | 6/2018 | Thakkar et al. |
| 10,038,628 B2 | 7/2018 | Ravinoothala et al. |
| 10,091,161 B2 | 10/2018 | Dubey et al. |
| 10,164,881 B2 | 12/2018 | Tubaltsev et al. |
| 10,237,123 B2 | 3/2019 | Dubey et al. |
| 10,305,757 B2 | 5/2019 | Yadav et al. |
| 10,333,849 B2 | 6/2019 | Masurekar et al. |
| 10,389,634 B2 | 8/2019 | Thakkar et al. |
| 10,560,320 B2 | 2/2020 | Shakimov et al. |
| 10,567,283 B2 | 2/2020 | Tubaltsev et al. |
| 10,616,045 B2 | 4/2020 | Dubey et al. |
| 10,645,204 B2 | 5/2020 | Dubey et al. |
| 10,652,143 B2 | 5/2020 | Ravinoothala et al. |
| 10,805,220 B2* | 10/2020 | Masurekar ............ H04L 47/125 |
| 10,924,408 B2* | 2/2021 | Raileanu ................ H04L 45/22 |
| 11,025,543 B2 | 6/2021 | Tubaltsev et al. |
| 11,115,262 B2 | 9/2021 | Dubey et al. |
| 2001/0043614 A1 | 11/2001 | Viswanadham et al. |
| 2002/0093952 A1 | 7/2002 | Gonda |

(56) References Cited

U.S. PATENT DOCUMENTS

| | | |
|---|---|---|
| 2002/0095498 A1 | 7/2002 | Chanda et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0074003 A1 | 4/2005 | Ball et al. |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056317 A1 | 3/2006 | Manning et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0198321 A1 | 9/2006 | Nadeau et al. |
| 2006/0239271 A1 | 10/2006 | Khasnabish et al. |
| 2006/0291388 A1 | 12/2006 | Amdahl et al. |
| 2007/0028244 A1 | 2/2007 | Landis et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0140235 A1 | 6/2007 | Aysan et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0031263 A1 | 2/2008 | Ervin et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0198858 A1 | 8/2008 | Townsley et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0016215 A1 | 1/2009 | Nadas et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0257440 A1 | 10/2009 | Yan et al. |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0046532 A1 | 2/2010 | Okita |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0149992 A1 | 6/2010 | Tan |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0241767 A1 | 9/2010 | Corry et al. |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1 | 12/2010 | Yevmenkin et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0069634 A1 | 3/2011 | Hajiaghayi et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0261818 A1 | 10/2011 | Komatsu |
| 2011/0261825 A1 | 10/2011 | Ichino |
| 2011/0283017 A1 | 11/2011 | Alkhatib et al. |
| 2011/0299386 A1 | 12/2011 | Negoto et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0063458 A1 | 3/2012 | Klink et al. |
| 2012/0102009 A1 | 4/2012 | Peterson et al. |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0182993 A1 | 7/2012 | Hadas et al. |
| 2012/0233331 A1 | 9/2012 | Voccio et al. |
| 2012/0236734 A1 | 9/2012 | Sampath et al. |
| 2012/0269091 A1 | 10/2012 | Ahrensbach et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058351 A1 | 3/2013 | Casado et al. |
| 2013/0083693 A1 | 4/2013 | Himura et al. |
| 2013/0121209 A1 | 5/2013 | Padmanabhan et al. |
| 2013/0125120 A1 | 5/2013 | Zhang et al. |
| 2013/0125230 A1 | 5/2013 | Koponen et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0155845 A1 | 6/2013 | Patel et al. |
| 2013/0212246 A1 | 8/2013 | Koponen et al. |
| 2013/0219078 A1 | 8/2013 | Padmanabhan et al. |
| 2013/0250951 A1 | 9/2013 | Koganti |
| 2013/0254599 A1 | 9/2013 | Katkar et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |

(56) References Cited

U.S. PATENT DOCUMENTS

| | | |
|---|---|---|
| 2014/0016501 A1 | 1/2014 | Kamath et al. |
| 2014/0050218 A1 | 2/2014 | Kamble et al. |
| 2014/0056125 A1 | 2/2014 | Guellal et al. |
| 2014/0156818 A1 | 6/2014 | Hunt |
| 2014/0195666 A1 | 7/2014 | Dumitriu et al. |
| 2014/0201733 A1 | 7/2014 | Benny et al. |
| 2014/0229945 A1 | 8/2014 | Barkai et al. |
| 2014/0247753 A1 | 9/2014 | Koponen et al. |
| 2014/0269705 A1 | 9/2014 | DeCusatis et al. |
| 2014/0301391 A1 | 10/2014 | Krishnan et al. |
| 2014/0313892 A1 | 10/2014 | Kamble et al. |
| 2014/0337515 A1 | 11/2014 | Naseh et al. |
| 2014/0341226 A1 | 11/2014 | Okita |
| 2014/0359343 A1 | 12/2014 | Fu |
| 2014/0372582 A1 | 12/2014 | Ghanwani et al. |
| 2015/0009831 A1 | 1/2015 | Graf |
| 2015/0010009 A1 | 1/2015 | Takahashi et al. |
| 2015/0063360 A1 | 3/2015 | Thakkar et al. |
| 2015/0063364 A1 | 3/2015 | Thakkar et al. |
| 2015/0244628 A1 | 8/2015 | Gredler et al. |
| 2015/0263899 A1 | 9/2015 | Tubaltsev et al. |
| 2015/0263946 A1 | 9/2015 | Tubaltsev et al. |
| 2015/0271011 A1 | 9/2015 | Neginhal et al. |
| 2015/0309901 A1 | 10/2015 | Pershin et al. |
| 2015/0372943 A1 | 12/2015 | Hasan et al. |
| 2016/0080483 A1 | 3/2016 | Li et al. |
| 2016/0173415 A1 | 6/2016 | Wang et al. |
| 2016/0205196 A1 | 7/2016 | Hasan et al. |
| 2016/0248703 A1 | 8/2016 | Gopalakrishnan et al. |
| 2016/0294612 A1 | 10/2016 | Ravinoothala et al. |
| 2016/0301603 A1 | 10/2016 | Park et al. |
| 2017/0005915 A1 | 1/2017 | Mirsky et al. |
| 2017/0118067 A1 | 4/2017 | Vedula |
| 2017/0126493 A1 | 5/2017 | Zhang et al. |
| 2017/0139789 A1 | 5/2017 | Fries et al. |
| 2017/0142012 A1 | 5/2017 | Thakkar et al. |
| 2017/0163532 A1 | 6/2017 | Tubaltsev et al. |
| 2017/0288981 A1 | 10/2017 | Hong et al. |
| 2017/0317954 A1 | 11/2017 | Masurekar et al. |
| 2017/0317971 A1 | 11/2017 | Dubey et al. |
| 2018/0006880 A1 | 1/2018 | Shakimov et al. |
| 2018/0176073 A1 | 6/2018 | Dubey et al. |
| 2018/0183667 A1 | 6/2018 | Dubey et al. |
| 2018/0302326 A1 | 10/2018 | Thakkar et al. |
| 2018/0324088 A1 | 11/2018 | Ravinoothala et al. |
| 2019/0075050 A1 | 3/2019 | Fubaltsev et al. |
| 2019/0158397 A1 | 5/2019 | Liu |
| 2019/0173982 A1 | 6/2019 | Dubey et al. |
| 2019/0306064 A1 | 10/2019 | Masurekar et al. |
| 2020/0092161 A1 | 3/2020 | Dubey et al. |
| 2020/0169503 A1 | 5/2020 | Tubaltsev et al. |
| 2020/0274797 A1 | 8/2020 | Ravinoothala et al. |
| 2021/0258254 A1 | 8/2021 | Tubaltsev et al. |

FOREIGN PATENT DOCUMENTS

| | | |
|---|---|---|
| CN | 101981560 A | 2/2011 |
| CN | 102215158 A | 10/2011 |
| CN | 102752410 A | 10/2012 |
| CN | 102884761 A | 1/2013 |
| CN | 103109516 A | 5/2013 |
| CN | 103534987 A | 1/2014 |
| CN | 103607432 A | 2/2014 |
| CN | 103890751 A | 6/2014 |
| CN | 103917967 A | 7/2014 |
| CN | 106576075 A | 4/2017 |
| EP | 1653688 A1 | 5/2006 |
| GB | 2419703 A | 5/2006 |
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | 2008129527 A2 | 10/2008 |
| WO | 2012168872 A1 | 12/2012 |
| WO | 2013113265 A1 | 8/2013 |
| WO | 2015138043 A2 | 9/2015 |
| WO | 2015142404 A1 | 9/2015 |
| WO | 2015147942 A1 | 10/2015 |
| WO | 2016164277 A1 | 10/2016 |

OTHER PUBLICATIONS

Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al., (U.S. Appl. No. 61/514,990), filed Aug. 4, 2011, 31 pages.

Koponen, Teemu, et al., "Network Virtualization in Multi-tenant Datacenters," Technical Report TR-2013-001E, Aug. 2013, 22 pages, VMware, Inc., Palo Alto, CA, USA.

Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.

Lin, Pingping, et al., "Seamless Interworking of SDN and IP," SIGCOMM '13, Aug. 12-16, 2013, 2 pages, ACM, New York, USA.

Maltz, David A., et al., "Routing Design in Operational Networks: A Look from the Inside," SIGCOMM '04, Aug. 30-Sep. 3, 2004, 14 pages, ACM, Portland, Oregon, USA.

Mechtri, Marouen, et al., "Inter and Intra Cloud Networking Gateway as a Service," 2013 IEEE 2nd International Conference on Cloud Networking (ClouNet), Nov. 11, 2013, 8 pages, IEEE.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 15, 2013, 15 pages, IEEE.

Wang, Wen-Ting, "A Virtual Network Subsystem of Cloud Platform," Computer Knowledge and Technology, Feb. 2013, 5 pages, vol. 9, Computer Knowledge and Technology Editorial Department, retrieved from http://www.dnzs.net.cn/.

\* cited by examiner

AUTOMATIC CONFIGURATION OF LOGICAL ROUTERS ON EDGE NODES

CLAIM OF BENEFIT TO PRIOR APPLICATIONS

This present application is a continuation application of U.S. patent application Ser. No. 16/428,670, filed May 31, 2019, now published as U.S. Patent Publication 2019/0306064. U.S. patent application Ser. No. 16/428,670 is a continuation application of U.S. patent application Ser. No. 15/420,043, filed Jan. 30, 2017, now issued as U.S. Pat. No. 10,333,849. U.S. patent application Ser. No. 15/420,043, claims the benefit of Indian Patent Application 201641014866, filed Apr. 28, 2016. U.S. patent application Ser. No. 16/428,670, now published as U.S. Patent Publication 2019/0306064, and U.S. patent application Ser. No. 15/420,043, now issued as U.S. Pat. No. 10,333,849, are incorporated herein by reference.

BACKGROUND

Typical physical networks contain several physical routers to perform L3 forwarding (i.e., routing). When a first machine sends a packet to a second machine located on a different IP subnet, the machine sends the packet to a router that uses a destination IP address of the packet to determine through which of its physical interfaces the packet should be sent out. In logical networks, user-defined data compute nodes (e.g., virtual machines) on different subnets also communicate with each other through logical switches and logical routers. A user (e.g., a datacenter network administrator, etc.) defines the logical elements (e.g., logical switches, logical routers) for a logical network topology. For a logical router that connects the logical network to one or more external networks, the user has to manually specify the edge nodes on which the logical routers are configured.

BRIEF SUMMARY

Some embodiments provide a method or tool for automatically configuring a logical router on one or more edge nodes of an edge cluster (e.g., in a hosting system such as a datacenter). The method of some embodiments configures the edge nodes to implement the logical router based on a configuration policy that dictates the selection method of the edge nodes. In some embodiments, an edge cluster includes several edge nodes (e.g., gateway machines), through which one or more logical networks connect to external networks (e.g., external logical and/or physical networks). In some embodiments, the configured logical router connects a logical network to an external network through the edge nodes.

The logical router, in some embodiments, includes one distributed routing component (also referred to as a distributed router or DR) and one or more service routing components (each of which is also referred to as a service router or SR). The distributed routing component is implemented in a distributed manner by numerous machines within the network (e.g., a hosting system network), while each service routing component is implemented by a single edge node. The method of some embodiments configures a logical router for the logical network by (1) configuring the distributed component of the logical router on several different host machines as well as one or more edge nodes, and (2) configuring the service components of the logical router only on the edge nodes.

The management plane cluster (e.g., a manager computer in the cluster, a manager application, etc.) of a logical network receives the logical network topology from a user (e.g., a tenant of a hosting system, a network administrator of the hosting system, etc.) in some embodiments. The user provides the logical network definition (e.g., logical network topology) to the management plane through a set of application programming interface (API) calls. The management plane, based on the received logical network definition, generates the necessary configuration data for the logical forwarding elements (e.g., logical switches, logical routers, logical middleboxes, etc.). The management plane then pushes the configuration data to a control plane of the network (e.g., to one or more controller machines or applications of the control plane). Based on the generated configuration data, the management and control planes configure the logical forwarding elements on a set of physical nodes (e.g., host machines, gateway machines, etc.) that implements the logical network.

When the logical network topology is connected to an external network, the management plane (e.g., a manager machine) of some embodiments automatically determines which edge nodes in the edge cluster are the ideal candidates for implementing the logical router(s) of the logical network. That is, the management plane identifies the best edge node candidate on which, a service component of the logical router can be installed (configured). In some embodiments, the management plane makes such a determination based on a configuration policy. That is, in some embodiments, the management plane receives a configuration policy from a user (e.g., the network administrator) and based on the received configuration policy, identifies the best edge nodes on which the logical routers of the logical network can be implemented. The management plane then configures the identified edge nodes to implement the logical router automatically (i.e., without any user intervention and only based on the configuration policy).

A logical router is deployed in a logical network topology in an active-active mode or active-standby mode in some embodiments. In the active-active mode, the management plane applies the same configuration rules for placement of each service router on an edge node in some embodiments. For active-standby mode, however, some embodiments may define two different sets of rules for the active and standby edge node selections. Some other embodiments may define the same set of rules for configuration of both active and standby service routers on the edge nodes. The configuration policy may also specify a static binding between active and standby edge node selections. For example, a user may define a rule in the logical router configuration policy which specifies when an active SR is configured on a first edge node, a second particular edge node should host a corresponding standby SR.

Before the management plane selects one or more edge nodes of an edge cluster as the candidates to configure the logical router, the management plane of some embodiments identifies the edge nodes on which the logical router should not and/or could not be realized. In some such embodiments, after excluding a set of disqualified edge nodes, the management plane starts analyzing the remaining edge nodes for configuring the logical router. The management plane disqualifies the edge nodes based on a set of constraining rules. These constraining rules, in some embodiments, includes user defined constraints, physical constraints, and product constraints.

The configuration policy, in some embodiments, includes a set of rules that determines the selection of the edge nodes (e.g., gateway machines). In some embodiments, the set of rules is ordered based on a ranking that is assigned (e.g., in the configuration policy) to each rule. In some such embodiments, the management plane first tries to identify an edge node that matches the highest ranked rule. That is, the management plane identifies the gateway machine that satisfies the specification that is set forth in the rule. In some embodiments, when the management plane does not find any matching edge node for the highest ranked rule, the management plane tries to find an edge node that matches the next highest ranked rule in the set of rules. If none of the edge nodes satisfies any of the policy rules, the management plane of some embodiments selects a first available edge node on which the logical router (i.e., service components of the logical router) can be configured.

In some embodiments, the configuration policy includes a rule that selects the next edge node in a sequential order (i.e., in the round robin approach). The configuration policy, in some embodiments, also includes rules that select an edge node that has been least recently used; an edge node that has the lowest connections (to the external networks); an edge node, through which, the lowest network traffic passes (i.e., the lowest number of packets is sent, through the edge node, to the external networks); an edge node, on which, the lowest number of logical routers (irrespective of their capacity) is configured; an edge node that has the lowest amount of aggregated capacity of configured logical routers; an edge node, on which other logical routers of the logical network (e.g., on a north-south path) have already been configured; and an edge node, on which, the least number of logical routers of other logical networks is configured (e.g., to ensure fault isolation between the tenants). In some other embodiments, the configuration policy includes other rules based on which the user chooses to configure the logical routers on the edge cluster.

The management plane of some embodiments deploys one or more databases (in one or more data storages) that keep the necessary statistical data, based on which, the management plane decides which edge node is the best candidate for configuring the defined logical routers. For instance, in a round robin approach, the management plane starts with the first available edge node and selects each next edge node based on the data the management plane retrieves from a data storage that keeps track of edge nodes that have not been selected yet. As another example, the database, in some embodiments, keeps track of the number of connections that each edge node has established to the external networks. This way, when the policy specifies that the best candidate is an edge node that has the least number of connections, the management plane identifies the best candidate by querying the database for an edge node with the least number of connections.

In some embodiments, the management plane queries the edge nodes of the edge cluster in order to receive these statistical data and stores the data in the database. In some embodiments, each time the management plane configures an edge node to implement a logical router (i.e., a service router of the logical router) or removes a logical router from an edge node, the management plane updates the statistical data in the database. Yet, in some other embodiments, the management plane employs both of these methods. That is, the management plane updates the database with each new transaction (e.g., addition or deletion of an SR), and at the same time, the management plane queries the edge nodes upon occurrence of an event (e.g., within certain time intervals) to receive more precise information to store in the database.

Some embodiments load balance the logical routers that are configured on the different edge nodes of an edge cluster. That is, in some embodiments, the management plane, based on occurrence of an event (e.g., user request, lapse of certain time period, node failure, etc.) identifies the logical routers that are implemented by each edge node, and based on the configuration policy, reassigns the different logical routers to different edge nodes. For instance, when an edge node fails or shuts down, the management plane of some embodiments automatically reassigns the implementation of the logical routers (among other logical entities) between the edge nodes that are still active in the edge cluster. In some embodiments, one or more changes in the configuration policy (e.g., addition of a new rule, deletion or modification of a current rule, etc.) could be the triggering event for reconfiguring the logical routers on the edge nodes of the edge cluster.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
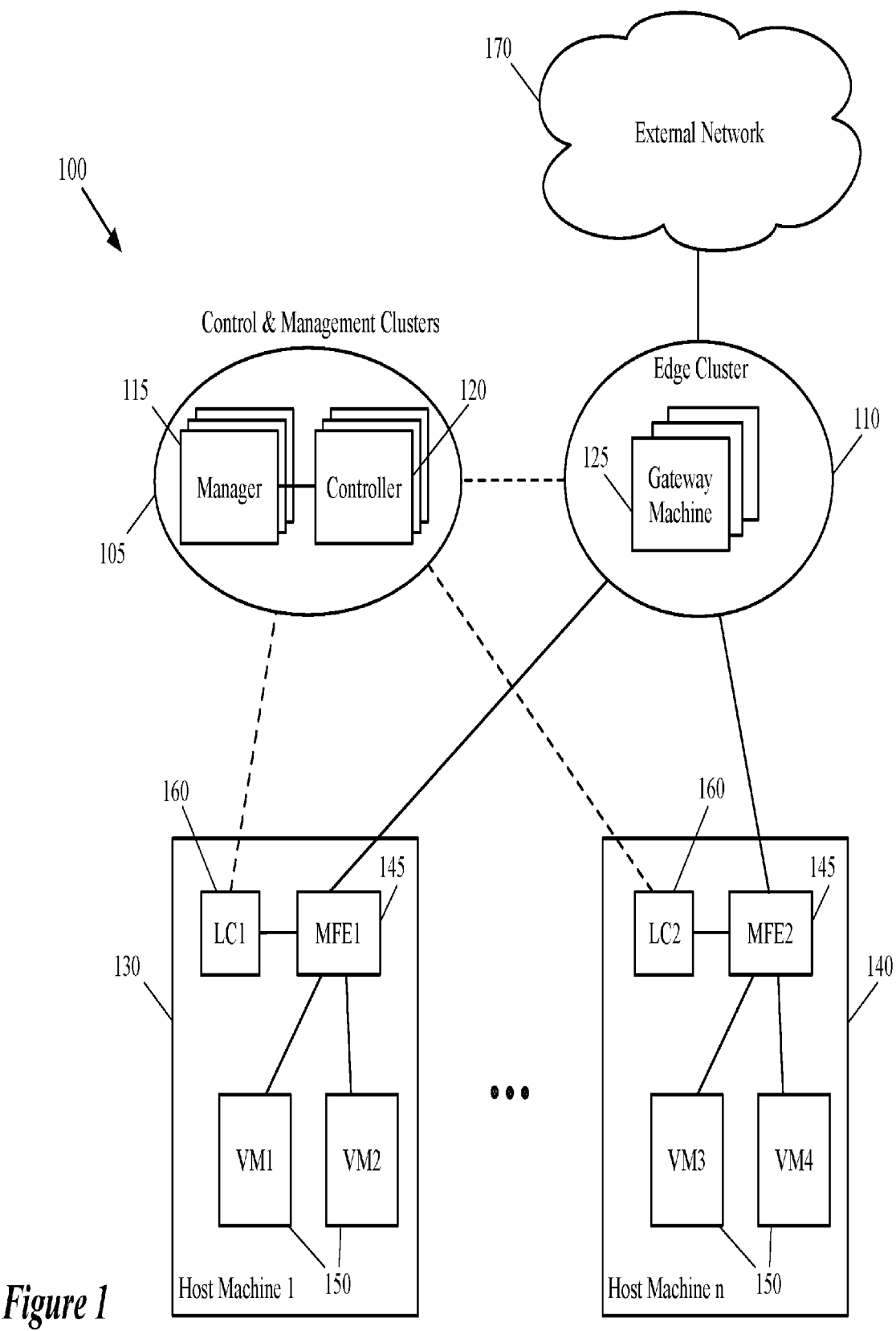
FIG. 1 conceptually illustrates a physical network topology that connects one or more logical networks, which are implemented on the physical network infrastructure, to one or more external networks.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method and tool for automatically configuring a logical router on one or more edge nodes of an edge cluster (e.g., in a hosting system such as a datacenter). The method of some embodiments configures the logical router on the edge nodes based on a configuration policy that dictates the selection method of the edge nodes. In some embodiments, an edge cluster includes several edge nodes (e.g., gateway machines), through which one or more logical networks connect to external networks (e.g., external logical networks and/or external physical networks).

In some embodiments, the configured logical router connects a logical network to an external network through the edge nodes. The logical router, in some embodiments, includes one distributed routing component (also referred to as a distributed router or DR) and one or more service routing components (each of which is also referred to as a service router or SR). The distributed routing component (DR) is implemented in a distributed manner by numerous machines within the network (e.g., a hosting system network), while each service component (SR) is implemented by a single edge node.

The method of some embodiments configures a logical router for the logical network by (1) configuring the DR of the logical router on several different host machines as well as one or more edge nodes, and (2) configuring the SR(s) of the logical router only on the edge nodes. A logical router that is automatically configured on an edge node includes an SR that is directly connected to an external network (i.e., the service router belongs to a logical router that is at the edge of the logical network topology), or an SR that is required to be implemented by the edge node (e.g., the service router belongs to a logical router that is in a middle layer of the logical network topology and provides stateful services).

As will be described in more detail below, when a middle layer logical router (e.g., a second tier logical router in a multi-tier network topology) is a fully distributed logical router and does not provide stateful services (e.g., network address translation (NAT), stateful firewall, load balancing, etc.), the logical router is not required to be implemented by an edge node (since the logical router does not have an SR, or for any other reason does not provide stateful services). Some embodiments do not configure such a logical router on any edge node of the edge cluster.

In some embodiments, the management plane cluster (e.g., a manager machine in the cluster, a manager application, etc.) of a logical network receives the logical network topology from a user (e.g., a tenant of a hosting system, a network administrator of the hosting system, etc.). The user provides the logical network definition (e.g., logical network topology) to the management plane through a set of application programming interface (API) calls in some embodiments. The management plane, based on the received logical network definition, generates the necessary configuration data for the logical forwarding elements (e.g., logical switches, logical routers, logical middleboxes, etc.). Based on the generated data, the management plane configures the logical forwarding elements on a set of physical nodes (e.g., host machines, gateway machines, etc.) that implements the logical network.

The management plane of some embodiments also pushes the generated configuration data to a control plane (e.g., one or more controllers in a central control plane (CCP) cluster) of the logical network. The control plane, in some embodiments, modifies the configuration of the logical forwarding elements (LFEs) on the physical nodes that implement the LFEs at runtime. That is, based on the generated configuration data that the control plane receives from the management plane and the runtime data that the control plane receives from the physical nodes, the control plane modifies the configuration of the LFEs on the physical nodes. In some embodiments, as will be described in more detail below, the management and control planes configure the LFEs on a physical node by configuring a managed forwarding element (MFE) that executes on the physical node (e.g., in the virtualization software of the physical node) to implement the LFEs of the logical network.

A logical network topology, in some embodiments, includes a set of logical network entities that are placed on different logical paths of the network. Examples of logical network entities in a logical network include logical forwarding elements (e.g., logical L2 and L3 switches, logical routers), logical middleboxes (e.g., logical firewalls, logical load balancers, etc.), and other logical network elements such as a source or destination data compute node (DCN) and a tunnel endpoint (e.g., implemented by an MFE). While a DCN or tunnel endpoint typically operates on a single host machine, a logical forwarding element or logical middlebox spans several different MFEs (e.g., software and/or hardware MFEs) that operate on different machines (e.g., a host machine, a top of rack hardware switch, etc.).

The logical forwarding elements of a logical network logically connect several different DCNs (e.g., virtual machines (VMs), containers, physical machines, etc.) that run on different host machines, to each other and to other logical and/or physical networks. The logical forwarding elements that logically connect the DCNs, in some embodiments, are part of a logical network topology for a user (e.g., a tenant) of a hosting system (e.g., a datacenter). In some embodiments, different subsets of DCNs reside on different host machines that execute software managed forwarding elements (MFEs). Each MFE, as stated above, executes on a physical node (e.g., a host machine) and implements the LFEs of the logical network to which a subset of DCNs that runs on the host machine is logically connected.

A software MFE, in some embodiments, is a software application and/or process that executes in a virtualization software (e.g., a hypervisor) of the physical node. Implementing the LFEs on a host machine, in some embodiments, includes performing network traffic forwarding processing for the packets that are originated from and/or destined for a set of DCNs that resides on the host machine on which the MFE operates. The LFEs are also implemented by one or more hardware MFEs (e.g., Top of Rack (TOR) switches) in some embodiments, in order to logically connect the physical machines (e.g., servers, host machines, etc.) that are connected to the hardware MFEs to other DCNs of the logical network. Additionally, as a particular physical host machine may host DCNs of more than one logical network (e.g., belonging to different tenants), the software MFE running on the host machine (or a hardware MFE) may implement different sets of LFEs that belong to different logical networks.

In some embodiments, as described above, the management plane (e.g., a manager machine or application) generates the logical network entities' data (i.e., the desired state) for a logical network topology. The management plane configures the logical network entities on different physical nodes based on the desired state. That is, a manager machine or application configures the virtualization softwares that run on the physical nodes to implement the logical network entities. The management plane also pushes the desired state to one or more controllers in the CCP cluster. The MFEs (e.g., MFEs operating in the host machines and gateway machines) also push runtime data related to LFEs that the MFEs implement (i.e., the discovered state of the LFEs) to the CCP cluster.

The CCP cluster processes the logical entity definition data (i.e., the desired state) received from the management plane along with the runtime data received from the MFEs (i.e., the discovered state) in order to generate configuration and forwarding data for the logical entities that are implemented on the MFEs at runtime. The configuration and forwarding data that is distributed to the physical nodes defines common forwarding behaviors of the MFEs that operate on the physical nodes in order to implement the LFEs. In some embodiments, a local controller that operates on each physical node (e.g., in the hypervisor of a host machine) receives the configuration and forwarding data from the CCP cluster first.

The local controller then generates customized configuration and forwarding data that defines specific forwarding behaviors of an MFE that operates on the same host machine on which the local controller operates and distributes the customized data to the MFE. The MFE implements the set of logical forwarding elements based on the configuration and forwarding data received from the local controller. Each MFE can be connected to several different DCNs, different subsets of which may belong to different logical networks for different tenants. As such, the MFE is capable of implementing different sets of logical forwarding elements for different logical networks. The MFE implements an LFE by mapping the LFE ports to the physical ports of the MFE in some embodiments.

FIG. 1 conceptually illustrates a physical network topology 100 that connects one or more logical networks implemented on the physical nodes of the network to one or more external networks. More specifically, this figure shows different physical nodes such as host machines, gateway machines, managers, and controllers of a physical network (e.g., physical network of a datacenter) that implement logical network entities of different logical networks and that connect the logical networks to external networks. FIG. 1 includes management and control clusters 105, an edge cluster 110, an external network 170, and two host machines 135 and 140. Each of the host machines shown in the figure includes a managed forwarding element 145 (MFE1 and MFE2), a local controller 160 (LC1 and LC2), and a set of data compute nodes 150 (VM1-VM4).

In some embodiments, the MFEs 145 are implemented in the virtualization software (e.g., hypervisor) of the host machines 135 and 140 (the hypervisors are not shown in the figure for simplicity of description). The management cluster includes a set of managers 115, while the controller cluster (CCP cluster) includes a set of controllers 120. The edge cluster 110 includes a set of edge nodes (e.g., gateway machines) 125 that handle north-south traffic of the logical networks (e.g., connects the logical networks implemented on the physical network to the external network 170).

For example, a logical network, which logically connects the VMs executing on the host machine 130 to the VMs that execute on the host machine 140, can be connected to the external network 170 through one or more gateway machines 125 of the edge cluster 110. The logical network (that includes e.g., a set of logical switches and logical routers) is configured and managed by the management and control clusters 105. The logical switches and routers of the logical network is implemented by the MFEs 145 that run on the host machines and a set of MFEs (not shown in this figure) that runs on the edge nodes of the edge cluster 170.

Each of the managers 115 and controllers 120 can be a physical computing device (e.g., a server, a computer, etc.), a data compute node (DCN) such as a virtual machine (VM), a container, etc., or a software instance (or a process) operating on a physical computing device or DCN. In some embodiments, a manager includes different user interface applications for administration, configuration, monitoring, and troubleshooting one or more logical networks in the physical network infrastructure (e.g., a hosting system network). A subset of one or more controllers of some embodiments controls the data communications between the different MFEs that implement the logical network elements of the logical network.

As described above, the CCP cluster (e.g., one or more controllers 120) controls the network data communication between the different DCNs of a logical network (e.g., between the VMs 150 in the illustrated example) by controlling the data communication between the MFEs 145. The CCP cluster communicates with the MFEs 145 in order to control the data exchange between the MFEs since the MFEs also implement virtual tunnel endpoints (VTEPs) that ultimately exchange the logical network data between the DCNs. In order to control the data exchange, the CCP cluster of some embodiments receives runtime data for the logical network entities (e.g., VMs 150, LFEs of the logical network, etc.) from each of the MFEs. The CCP cluster 120 also receives the logical topology data (i.e., the desired state of the logical network) from the management cluster (e.g., a manager 115) and uses the desired state data along with the runtime data in order to control the data communications of the logical network.

Typical logical network definition data, in some embodiments, includes data that defines the location of DCNs (e.g., the distribution of VMs on host machines), data that defines connection topology between the DCNs and locations of the LFEs in the topology, data that defines middlebox services, which are applied to the LFEs (e.g., distributed firewall policies), etc. Typical runtime data, in some embodiments, includes layer 2 control plane tables such as virtual tunnel endpoint (VTEP) tables, media access control (MAC) tables, address resolution protocol (ARP) tables; layer 3 routing tables such as routing information base (RIB) tables, forwarding information base (FIB) tables; statistics data collected from MFEs, etc.

In some embodiments, the local controller 160 of each hypervisor of the host machines receives logical network data from a controller 120 of the CCP cluster. The local controller 160 then converts and customizes the received logical network data for the local MFE 145 that operates on the same machine on which the local controller operates. The local controller then delivers the converted and customized data to the local MFEs 145 on each host machine. In some embodiments, the connections of the end machines to an LFE (e.g. a logical switch) are defined using logical ports of the LFE, which are mapped to the physical ports of the MFEs (e.g., a first logical port of the LFE is mapped to a physical port of MFE1 that is coupled to VM1 and a second logical port of the LFE is mapped to another physical port of MFE2 that is connected to VM3).

As described above, in some embodiments, the LFEs (logical routers and switches) of a logical network are implemented by each MFE that executes on a host machine. For example, when an MFE (e.g., MFE1) receives a packet from a DCN (e.g., VM1) that couples to a first port of a logical switch, the MFE performs the network forwarding processing for the logical switch, to which the DCN logically couples. The MFE also performs the forwarding processing for any additional LFE (e.g., logical router processing if the packet is sent to an external network (e.g., external network 170), logical router processing and processing for another logical switch in the network if the packet is sent to an end machine (DCN) coupled to the other logical switch, etc.).

Based on the forwarding processing, the MFE can decide where to send the received packet. For example, if the packet should be sent to VM3 that is coupled to a second port of the LFE that is implemented by MFE2, MFE1 sends the packet to MFE2 (through an established tunnel between MFE1 and MFE2), to be delivered to VM3. In the illustrated figure, the dashed lines that connect the management and control plane to the edge cluster and host machines represent the management and control plane data exchange while the solid lines represent the data plane exchange between the host machines and edge cluster.

When the logical network topology is connected to an external network, the management plane (e.g., a manager 115) automatically determines which edge nodes in the edge cluster 170 are the ideal candidates for implementing the logical router(s) of the logical network. That is, the management plane identifies the best edge node candidate on which, a service component of the logical router can be installed (configured). In some embodiments, the management plane makes such a determination based on a configuration policy. That is, in some embodiments, the management plane receives the configuration policy from a user (e.g., the network administrator) and based on the received configuration policy, identifies the best edge nodes on which the logical routers of the logical network can be implemented. The management plane then configures the logical routers on the identified edge nodes automatically (i.e., solely based on the configuration policy and without any user intervention).

Before the management plane selects one or more edge nodes of an edge cluster as the candidates to configure the logical router, the management plane of some embodiments identifies the edge nodes on which the logical router should not and/or could not be realized. In some such embodiments, after excluding a set of disqualified edge nodes, the management plane starts analyzing the remaining edge nodes for configuring the logical router. The management plane disqualifies the edge nodes based on a set of constraining rules. These constraining rules, in some embodiments, includes, but is not limited to user defined constraints, physical constraints, and product constraints.

A user constraint, as its name suggests, is an edge node selection restriction that is specified by a user. That is, the user defines one or more rules to restrict the placement of logical routers on the edge nodes. For example, the user may specify that the logical routers of a first tenant may not coexist with the logical routers of a second tenant on the edge nodes. As such, before the management plane configures the logical routers of any of these two tenants, the management plane excludes certain edge nodes of the edge cluster on which, a logical router of the other tenant has already been configured.

A physical constraint includes one or more limitations in the system resources of an edge node because of which, the edge node is not able to realize the logical router. For example, a particular logical router may require a particular processor (CPU) architecture or a certain amount of memory that the edge node does not provide. As another example, a logical router may need a particular type of network interface controller that does not exist on a particular edge node. A product constraint, on the other hand, arises from a product internal requirements. For example, certain services (e.g., stateful firewall) in a particular release of a product may need exclusive access to an edge node. Such a restriction makes the edge node unavailable to a service router of a logical router. Additionally, some services in a logical router itself may require exclusive access to an edge node, in which case, the edge node cannot be shared by other logical routers. The product constraints may be different in different releases of a product.

One of ordinary skill in the art would realize that the number of the host machines, managers, controllers, edge nodes, and virtual machines illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments.

As described before, the management plane of some embodiments receives a definition of a logical network and generates configuration data that defines the different logical forwarding entities of the logical network. One such logical forwarding entity of a logical network is a logical router. In some embodiments, the management plane receives a definition of a logical router (e.g., through one or more API calls) and defines a distributed logical router that includes several routing components. Each of these routing components is separately assigned a set of routes and a set of logical interfaces (ports).

Each logical interface of each routing component is also assigned a network layer (e.g., Internet Protocol or IP) address and a data link layer (e.g., media access control or MAC) address. In some embodiments, the several routing components defined for a logical router include a single distributed router (also referred to as distributed routing component) and several different service routers (also referred to as service routing components). In addition, the management plane of some embodiments defines a transit logical switch (TLS) for handling communications between the components internal to the logical router (i.e., between the distributed router and the service routers).

Some embodiments implement the distributed routing component of the logical router in a distributed manner across the different MFEs in a same manner that a logical L2 switch spans the different MFEs. The MFEs on which the distributed router (DR) is implemented includes (1) software MFEs that operate on the hypervisors of the host machines and edge nodes, and (2) other hardware VTEPs (e.g., third-party TOR switches). Some embodiments implement each of the service routing components of the logical network on only an edge node (e.g., a gateway), which is a machine at the edge of the network (e.g., the datacenter network) in some embodiments, in order to communicate with one or more external networks. Each service router (SR) has an uplink interface for communicating with an external network as well as a TLS interface for connecting to the transit logical switch and communicating the network data with the distributed routing component of the logical router that is also connected to the TLS.

The SRs of a logical router, in some embodiments, may be configured in active-active or active-standby mode. In active-active mode, all of the service components are fully functional at the same time, and traffic can ingress or egress from the logical network through the service components using equal-cost multi-path (ECMP) forwarding principles (balancing the traffic across the various service routing components). In this mode, each logical interface of each separate service component has unique IP and MAC addresses for communicating with an external network and/or with the distributed component (through the transit logical switch).

In the active-active mode, the management plane of some embodiments applies the same configuration rules for placement of each service router on an edge node. That is, the manager analyzes the same set of rules in the configuration policy to configure the first active SR of the logical router on a first edge node and the second active SR on a second edge node. For active-standby mode, however, some embodiments may define two different sets of rules for the active and standby edge node selections.

Some other embodiments may define the same set of rules for configuration of both active and standby service routers on the edge nodes. The configuration policy may also specify a static binding between active and standby edge node selections. For example, a user may define a rule in the logical router configuration policy which specifies when an active SR is configured on a first edge node, a second particular edge node should host a corresponding standby SR.

In some embodiments, the logical router is part of a multi-tier logical network structure. For example, a two-tier logical router structure of some embodiments includes (1) a single logical router (referred to as a provider logical router or PLR) for connecting the logical network (along with other logical networks) to one or more networks external to the hosting system, and (2) multiple logical routers (each referred to as a tenant logical router or TLR) that connect to the PLR and do not separately communicate with the external network. In some embodiments a PLR is defined and administrated by a user at the hosting system (e.g., a datacenter network administrator), while each TLR is defined and administered by a tenant of the hosting system (or both by the tenant and a user from the datacenter). In some embodiments, the management plane defines a transit logical switch between the distributed component of the PLR and the service components of the TLR. The concepts of TLR and PLR are described in more detail below by reference to FIGS. 9-11.

Some embodiments provide other types of logical router implementations in a physical network (e.g., a datacenter network) such as a centralized logical router. In a centralized logical router, L3 logical routing functionalities are performed in only gateway machines, and the management plane of some embodiments does not define any distributed routing component and instead only defines multiple service routing components, each of which is implemented in a separate gateway machine. Different types of logical routers (e.g., distributed logical router, multi-layer logical routers, centralized logical router, etc.) and implementation of the different types of logical routers on edge nodes and managed forwarding elements operating on host machines of a datacenter are described in greater detail in the U.S. patent application Ser. No. 14/814,473, filed Jul. 30, 2015.

Logical routers, in some embodiments, can be viewed from three different perspectives. The first of these views is the API view, or configuration view, which is how the user (e.g., a datacenter provider or a tenant) views and defines the logical router in a logical network topology. The second view is the management plane view, which is how the management cluster (e.g., a manager machine or application in the management cluster) internally defines (i.e., generates the configuration data of) the logical router. Finally, the third view is the physical realization, or implementation of the logical router, which is how the logical router is actually implemented on different physical nodes in the physical network infrastructure (e.g., a datacenter network infrastructure).

Figure 2:
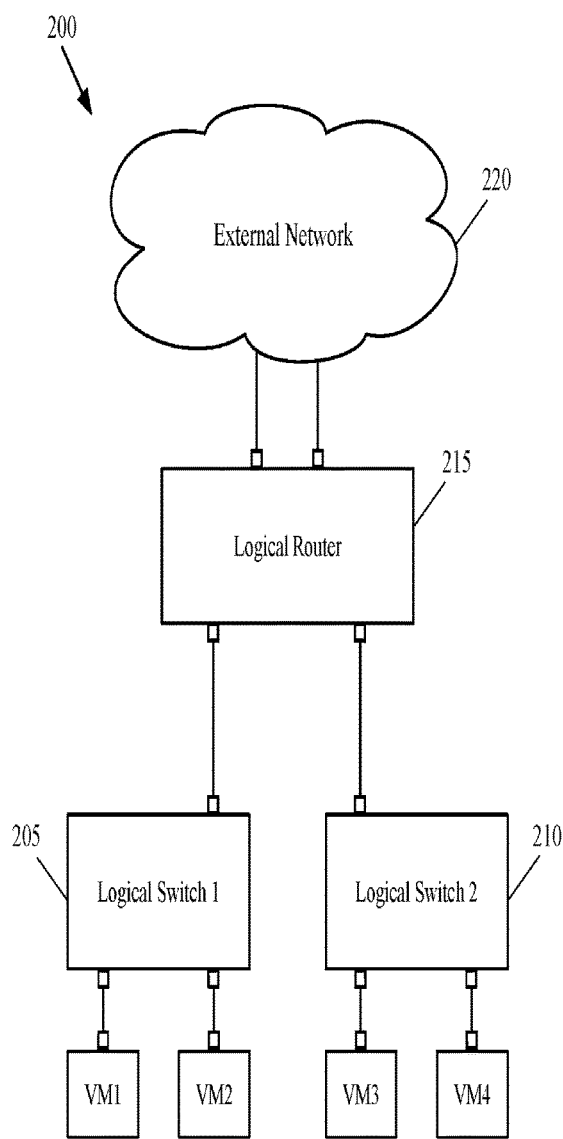
FIG. 2 illustrates a configuration view of a logical router, which represents a logical network as designed by a user.
Figure 3:
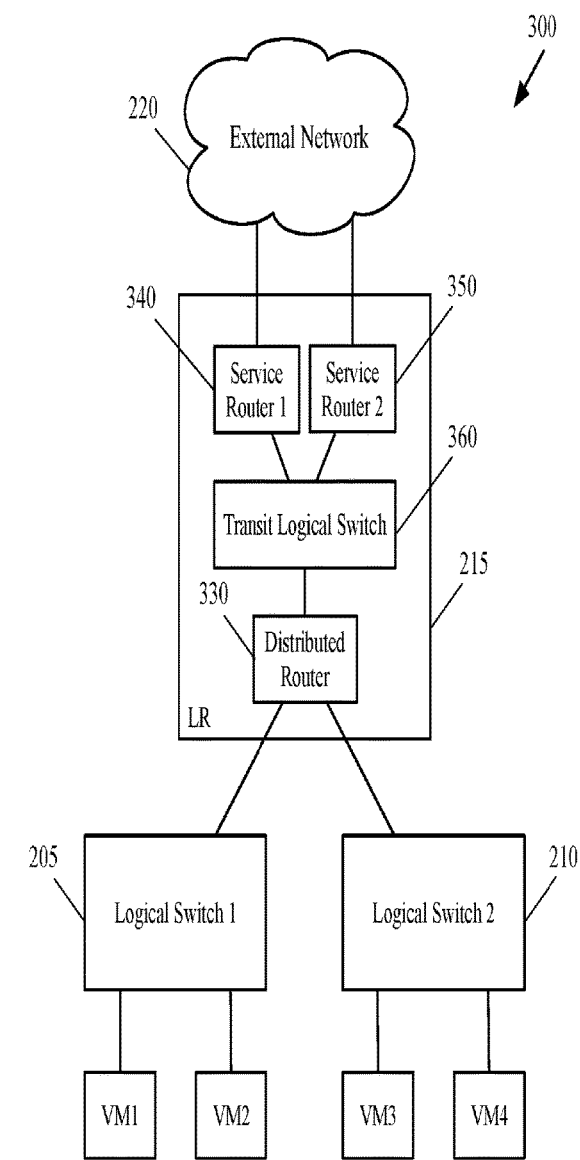
FIG. 3 illustrates a management plane view of a logical network when the logical router is implemented in a distributed manner.
Figure 4:
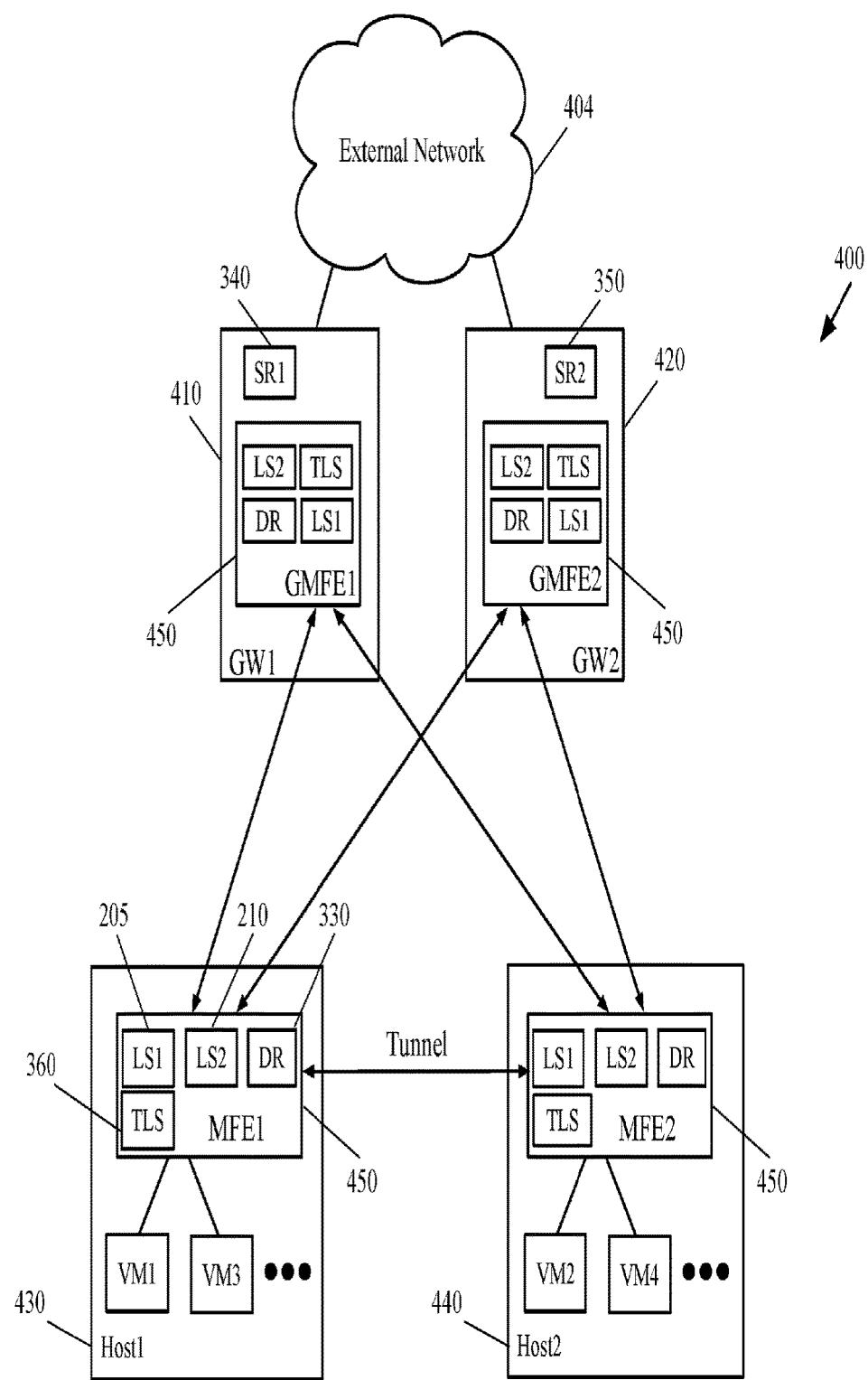
FIG. 4 illustrates a physical distributed implementation of a logical router defined for a logical network.

FIGS. 2-4 illustrate the above-described different views of a logical router in a logical network that logically connects different end machines to each other and to other networks through different managed forwarding elements. More specifically, FIG. 2 illustrates a configuration view of a logical router, which represents a logical network as designed (or defined) by a user. The figure shows a logical network 200 that includes a logical router 215 and two logical switches 205 and 210. The logical router 215 has two logical ports that are connected to the logical switches 205 and 210. Logical switch 205 has logical ports that are coupled to virtual machines VM1 and VM2, while the logical switch 210 has logical ports that are coupled to virtual machines VM3 and VM4. The logical router 215 also includes two logical ports that are connected to the external physical network 220.

In some embodiments, a user (e.g., datacenter network administrator, a tenant, etc.) defines each of the logical network entities 205-215 through a set of API calls. For example the user executes an API call to create the logical switch 205 and two more API calls to create the two logical ports of the logical switch that are coupled to the virtual machines VM1 and VM2. Similarly, the user executes a set of API calls to generate the other logical forwarding elements that are shown in the figure. These API calls are received by a manager of the network, which in turn generates the configuration data for each logical network element and publishes the generated configuration data to the CCP cluster as well as other physical nodes of the physical network that implement the logical network entities.

FIG. 3 illustrates a management plane view 300 of the logical network 200 that is shown in FIG. 2. The management plane view 300 for the distributed implementation illustrates that the management plane, after receiving the definition of the logical router (e.g., the API calls from the user), creates a distributed routing component 330, two service routing component 340 and 350, and a transit logical switch 360 based on the received logical router definition.

In some embodiments, the management plane generates separate routing information bases (RIBs) and/or forwarding information bases (FIBs) for each of the service routers 330-350. That is, in addition to having separate objects created in the management plane, each of the SRs 330-350 is treated as a separate router with separate routing tables. The transit logical switch 360 has different logical ports that couple to each of the routing components 330-350 and each of these routing components has an interface to logically connect to the transit logical switch 360.

In some embodiments, the DR 330 is always located on the southbound side (i.e., facing the data compute nodes of the logical network, rather than facing the external physical network) of the logical router implementation. Unless the logical router has no service component, some embodiments do not configure the uplinks of the logical router for the distributed component, whose northbound interfaces instead couple to the transit logical switch that is part of the logical router 215.

In some embodiments SRs 340 and 350 may deliver services (i.e., functionalities beyond simply routing, such as NAT, firewall, load balancing, etc.) in addition to providing the connection between the logical network and external physical networks. In some embodiments, the implementation of the SRs is designed to meet several goals. First, the implementation ensures that the services can scale out—that is, the services assigned to a logical router may be delivered by any of the several SRs of the logical router. Second, some embodiments configure the SR in such a way that the service policies may depend on routing decisions (e.g., interface-based NAT). Finally, the SRs of a logical router have the ability to handle failure (e.g., of the physical machine on which an SR operates, of the tunnels to that physical machine, etc.) among themselves without requiring the involvement of a centralized control plane or management plane (though some embodiments allow the SRs to operate at reduced capacity or in a suboptimal manner).

FIG. 4 illustrates the physical distributed implementation of the logical router 215 of FIG. 2. More specifically, this figure shows how the physical nodes of the physical network architecture 400 implement the logical forwarding elements of the logical network architecture 200 shown in FIG. 2. The physical nodes shown in this figure include two gateway machines 410 and 420, and two host machines 430 and 440. The figure also shows that an external network 405 is connected to the two gateway machines 410 and 420. Each of the illustrated physical nodes includes an MFE 450 that operates in the virtualization software of the physical nodes in some embodiments. The host machine 430 hosts the virtual machines VM1 and VM3 along a set of other data compute nodes, while the host machine 440 hosts the virtual machines VM2 and VM4 along a set of other data compute nodes.

Each MFE 450 implements the LFEs of the logical network by performing the forwarding processing of the LFEs for the packets that are received from or sent to the corresponding VMs that are connected to the MFE, and/or the external network 405. For example, the first port of the logical switch 205 shown in FIG. 2 is mapped to a physical port of MFE1 that is coupled to VM1, while the second port of the logical switch 205 is mapped to a physical port of MFE2 that is coupled to VM2. As stated above, the two gateway machines 410 and 420 are connected to the external network 405 as well as the host machines 430 and 440. Each host machine hosts a set of end machines and executes an MFE 450. In addition to executing an MFE, each of the gateway machines also executes a service router (e.g., an SR instance or application).

Although, in the illustrated example two end machines that are connected to the same logical switch are hosted by two different host machines (e.g., VM1 and VM2 that are connected to the same logical switch, execute on two different host machines Host1 and Host2), two or more end machines that are connected to a same logical switch might as well operate on the same host machine. The virtual machines VM1 and VM3 communicate (e.g., exchange network data) with each other, with the virtual machines VM2 and VM4, and with the external network via the managed forwarding elements that implement the logical entities of the logical network 200 and the service routers.

In some embodiments, the MFEs 450 operating on the host machines are physical software switches provided by the hypervisors or other virtualization software of the host machines. These MFEs perform the entire first-hop forwarding processing for the logical switches 205 and 210 on packets that are received from the virtual machines VM1-VM4 of the logical network 200 (unless the pipeline of the transit logical switch 360 of the MFE specifies to send the packet to a SR). The MFEs residing on the host machines Host1 and Host2 may also implement logical switches (and distributed logical routers) for other logical networks if the other logical networks have VMs that reside on the host machines Host1 and Host2 as well.

Since each MFE 450 may perform first hop processing, each MFE implements all of the logical forwarding elements including the logical switches 205 and 210 and the DR 330, as well as the TLS 360. As described above, the MFEs implement the logical forwarding elements of the logical network to which the local end machines are logically connected. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

In some embodiments, when the MFE receives a packet from a VM that is coupled to the MFE, it performs the processing for the logical switch to which that VM logically couples, as well as the processing for any additional logical forwarding elements (e.g., logical router processing if the packet is sent to an external network, logical router processing and processing for the other logical switch in the network if the packet is sent to an end machine coupled to the other logical switch, etc.). The management and control planes distribute the logical forwarding data of the L2 logical switches 205 and 210, and the router 215 to the MFEs 450 in order for the MFEs to implement these logical forwarding elements. Additionally, the management and control plane distribute the logical forwarding data of the SRs to the gateway machines to connect the virtual machines VM1-VM4 to each other and to the external network.

The distributed router 330 and the TLS 360, as shown in the figure, are implemented across the MFEs 450 (e.g., in the same manner that the other logical forwarding elements are implemented). That is, the datapaths (e.g., in the MFEs 450, or in a different form factor on the gateway machines) all include the necessary processing pipelines for the DR 330 and the TLS 360. Unlike the DR, each of the two service routers 340 and 350 operates on a single gateway machine. In some embodiments an SR may be implemented as a virtual machine or other type of container. The choice for the implementation of an SR, in some embodiments, may be based on the services chosen for the logical router and which type of SR best provides those types of services.

In some embodiments, the edge nodes 410 and 420 are host machines, which host service routers rather than user VMs. These edge nodes handle the north-south traffic of the logical network (e.g., connect the logical network 200 to the external network 404). As shown in the figure, each of the gateway machines includes an MFE as well (i.e., GMFE1 and GMFE2), which are similar to the other MFEs operating on the other host machines that implement the logical forwarding elements of the logical network 200. In the illustrated example, the service routers are shown as separate modules from the MFEs that operate on the gateway machines. Different embodiments, however, may implement the SRs differently. While some embodiments implement the SRs as VMs (e.g., when the MFE is a software switch integrated into the virtualization software of the gateway machine), some embodiments implement the SRs as virtual routing and forwarding (VRFs) elements within the MFE datapath (e.g., when the MFE uses DPDK for the datapath processing).

In either case, the MFE treats the SR as part of the datapath, but in the case of the SR being a VM (or other data compute node) separate from the MFE, the MFE sends the packet to the SR for processing by the SR pipeline (which may include the performance of various services). As with the MFEs on the host machines Host1 and Host2, the GMFEs of the gateway machines, as described above, are configured to perform all of the distributed processing components of the logical network. The different MFEs and GMFEs that implement the logical forwarding elements use a tunnel protocol in order to exchange the network data between the different elements of the logical network 200. In some embodiments, the management plane (e.g., a master manager in the management cluster) distributes configuration data to the MFEs and GMFEs (e.g., through separate controllers each of which is associated with a single MFE and/or GMFE), which includes forwarding data that defines how to set up tunnels between the MFEs.

For instance, the configuration data specifies the location (e.g., IP address) of each MFE as a tunnel endpoint (i.e., a software VTEP or a hardware VTEP in case of a TOR hardware switch implemented on a port of the MFE). The different MFEs receive the tunnel endpoint addresses of the other MFEs that implement the logical forwarding elements from the CCP cluster and store these addresses in the MFEs' corresponding VTEP tables. The MFEs then use these VTEP tables to establish tunnels between each other. That is, each source VTEP (e.g., the VTEP that sends the network data to a destination VTEP) uses its corresponding VTEP table data to encapsulate the packets received form a source VM. The source VTEP encapsulate the packets using a particular tunnel protocol (e.g., VXLAN protocol), and forwards the packets towards the destination VTEP. The destination VTEP then decapsulates the packets using the same particular tunnel protocol and forwards the packets towards a destination VM.

As an example, when VM1 sends a northbound packet to the external network 405, the datapath on MFE1 initially runs the source logical switch 205 pipeline (e.g., based on the ingress port through which the packet is received, the source MAC address, etc.). This pipeline specifies to forward the packet to the DR 330, the pipeline for which also takes place on the source MFE1. This pipeline identifies one of the SRs 340 and 350 as its next hop. In the active-standby case, the pipeline identifies the active SR; in the active-active case, some embodiments use ECMP to select one of the SRs. Next, the source MFE1 executes the pipeline for the transit logical switch 360, which specifies to tunnel the packet to the appropriate gateway machine (edge node) that hosts the selected SR (e.g., SR1 running on the gateway machine 410). The MFE1 then encapsulates the packet with the required data to send the packet to the GMFE1 (e.g., MFE1 adds its own IP address to the outer packet header as the source VTEP and the IP address of the GMFE as the destination VTEP).

The gateway machine (e.g., the GMFE1 running on the gateway machine) receives the packet, decapsulates it (i.e., removes the tunneling data in the outer header of the packet), and identifies the SR1 based on the logical context information on the packet (e.g., the VNI of the transit logical switch 360) as well as the destination MAC address that corresponds to the SR1's southbound interface. The SR1 pipeline is then executed (e.g., by a VM implementing the SR1 in some embodiments, by the GMFE1 in other embodiments). The SR1 pipeline ultimately sends the packet to the physical external network. In some embodiments each SR's northbound interface is coupled to a physical router that receives the packet from the SR and distributes the packet towards its final destination in the external network.

As another example, when a packet that is destined for VM4 executing on the host machine 440 is received at gateway machine 420 (at the SR 350), the SR pipeline identifies the DR 330 as its next hop. The GMFE2 operating on the gateway machine then executes the transit logical switch 360 pipeline, which forwards the packet to the DR 330, as well as the DR 330 pipeline, which routes the packet towards its destination. The destination logical switch pipeline (i.e., the logical switch 210) is also executed on the GMFE2, which specifies to tunnel the packet to the MFE2 of the host machine 440 on which the destination virtual machine VM4 resides. After decapsulating the packet, the destination MFE2 delivers the packet to the virtual machine VM4.

Figure 5:
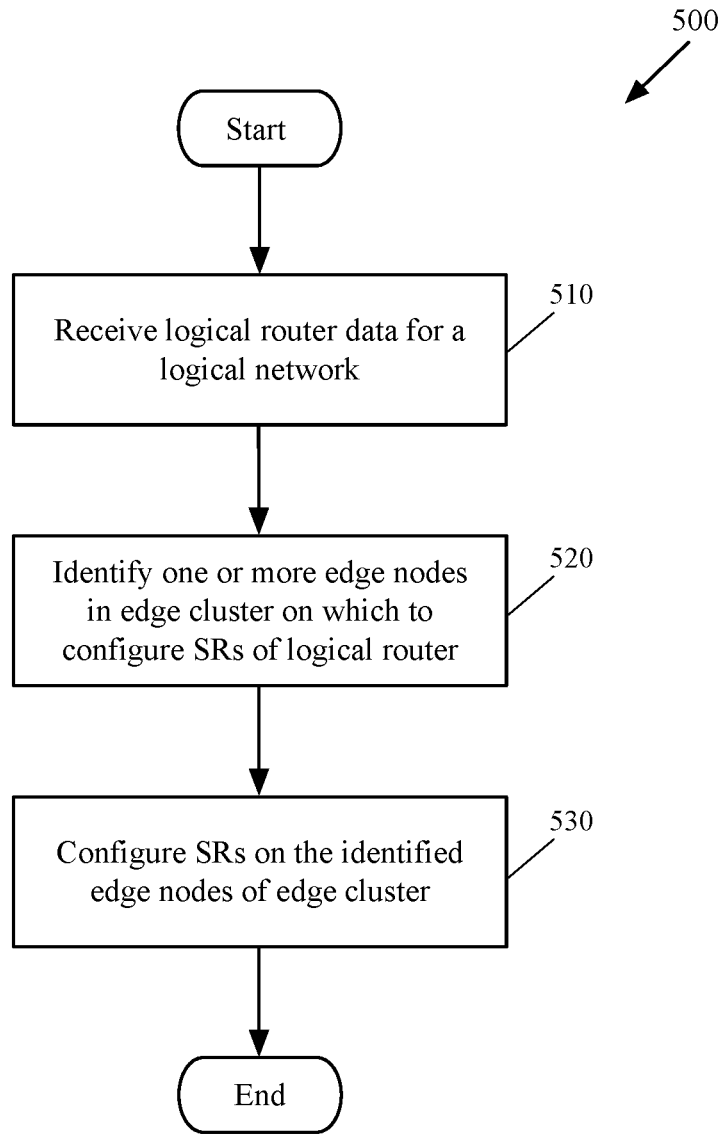
FIG. 5 conceptually illustrates a process of some embodiments that configures a logical router on one or more edge nodes of a physical infrastructure that implements one or more logical networks.

FIG. 5 conceptually illustrates a process 500 of some embodiments that configures a logical router on one or more edge nodes of a physical infrastructure that implements one or more logical networks. The process 500, in some embodiments, is performed by a manager computer or application in the management cluster that manages one or more logical networks for one or more tenants of a hosting system. The process starts by receiving (at 510) a logical router definition. The process receives the definition of the logical router along with other logical entities of the logical network from a user such as a tenant of the datacenter or a datacenter manager through a set of API calls. The process of some embodiments then generates, as part of the configuration data for the logical router, a DR and a set of SRs based on the received definition of the logical router.

The process then identifies (at 520) one or more edge nodes in an edge cluster for configuring the identified set of SRs (as well as the DR and other necessary logical network entities). The process of some embodiments, as will be described in more detail below by reference to FIG. 6, identifies the edge nodes based on a set of rules that is stored in a logical router policy of the logical network in a database. The process first identifies how many SR is generated in the logical router's configuration data and then for each SR, identifies the next best candidate in the set of edge nodes based on the logical router configuration policy.

Finally, the process configures (at 530) each SR on the identified edge node. The process of some embodiments also configures the DR of the logical router in the edge nodes as well as other host machines that implement the logical router. The IP and MAC addresses and other configuration details assigned to the interfaces of the logical router (e.g., the four interfaces of the logical router 215 in FIG. 2) as part of the logical router definition are used to generate the configuration for the various components (i.e., the distributed component and the service routing components) of the logical router.

In addition, as part of the configuration, some embodiments generate a routing information base (RIB) for each of the logical router components. That is, although the administrator defines only a single logical router, the management plane and/or control plane of some embodiments generates separate RIBs for the DR and for each of the SRs. For the SRs of a PLR, in some embodiments the management plane generates the RIB initially, but the physical implementation of the SR also runs a dynamic routing protocol process (e.g., BGP, OSPF, etc.) to supplement the RIB locally.

The specific operations of the process 500 may not be performed in the exact order shown and described. The specific operations may not be performed in one continuous series of operations, and different specific operations may be performed in different embodiments. For example, some embodiments do not identify all the edge nodes first and then configure the SRs on the identified edge nodes the way it was described in this figure, In some such embodiments, the process first selects the first SR of the logical router and identifies the appropriate edge node on which to install the SR. After configuring the SR on the identified edge node, these embodiments select the next SR of the logical router and identify the next appropriate edge node on which to configure the next SR. Additionally, one of ordinary skill in the art would realize that the process 500 could be implemented using several sub-processes, or as part of a larger macro process.

As described above, the management plane (e.g., a manager computer or application in the management cluster) of some embodiments identifies the edge nodes for configuring the service routers of a logical router based on a logical router configuration policy that is stored in a database. The configuration policy, in some embodiments, includes a set of rules that determines the selection of the edge nodes (e.g., gateway machines). In some embodiments, the set of rules is ordered based on a ranking that is assigned to each rule. In some such embodiments, the management plane first tries to identify an edge node that matches the highest ranked rule. That is, the management plane identifies the gateway machine that satisfies the specification that is set forth in the rule. In some such embodiments, when the management plane does not find any match for the highest ranked rule, the management plane tries to find an edge node that matches the next highest ranked rule in the set of rules. If none of the edge nodes satisfies any of the policy rules, the management plane of some embodiments selects a first available edge node on which the logical router can be configured.

Figure 6A:
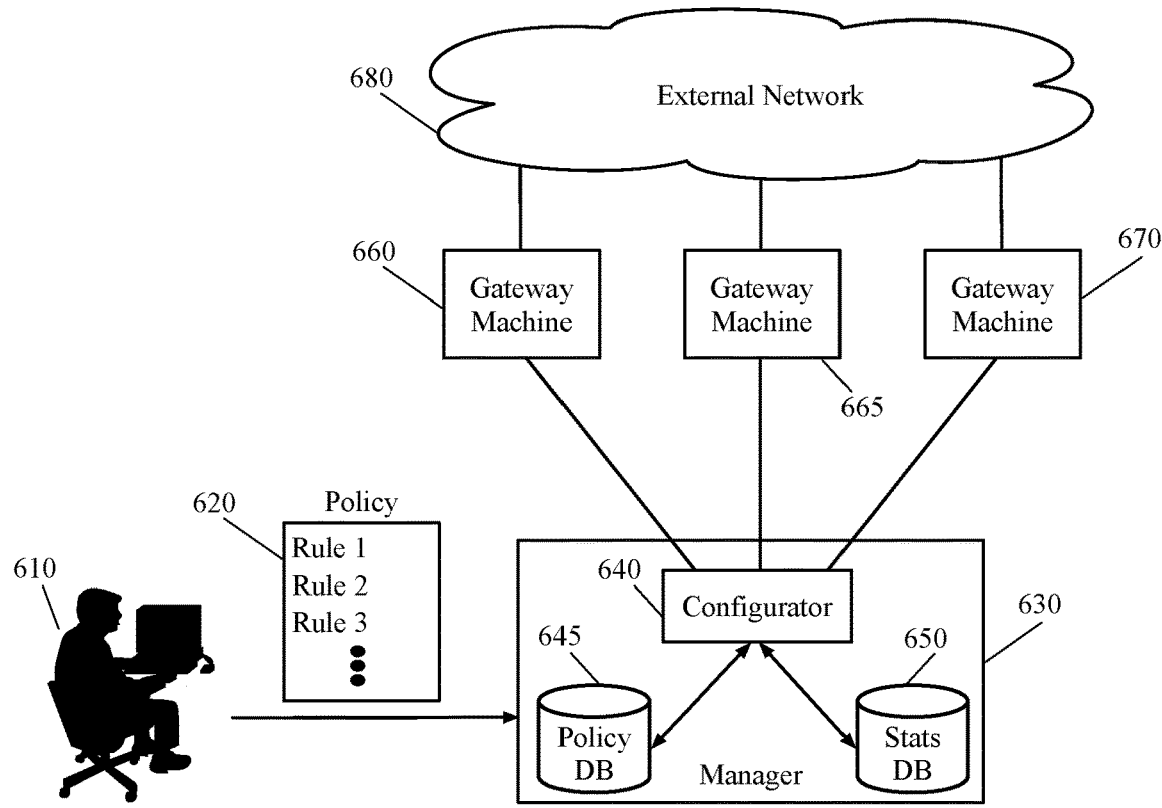
FIGS. 6A-6B illustrate a manager of a logical network that receives the logical router configuration policy and logical network's definition from one or more users and configures the logical routers of the logical network on one or more edge nodes based on the configuration policy.
Figure 6B:
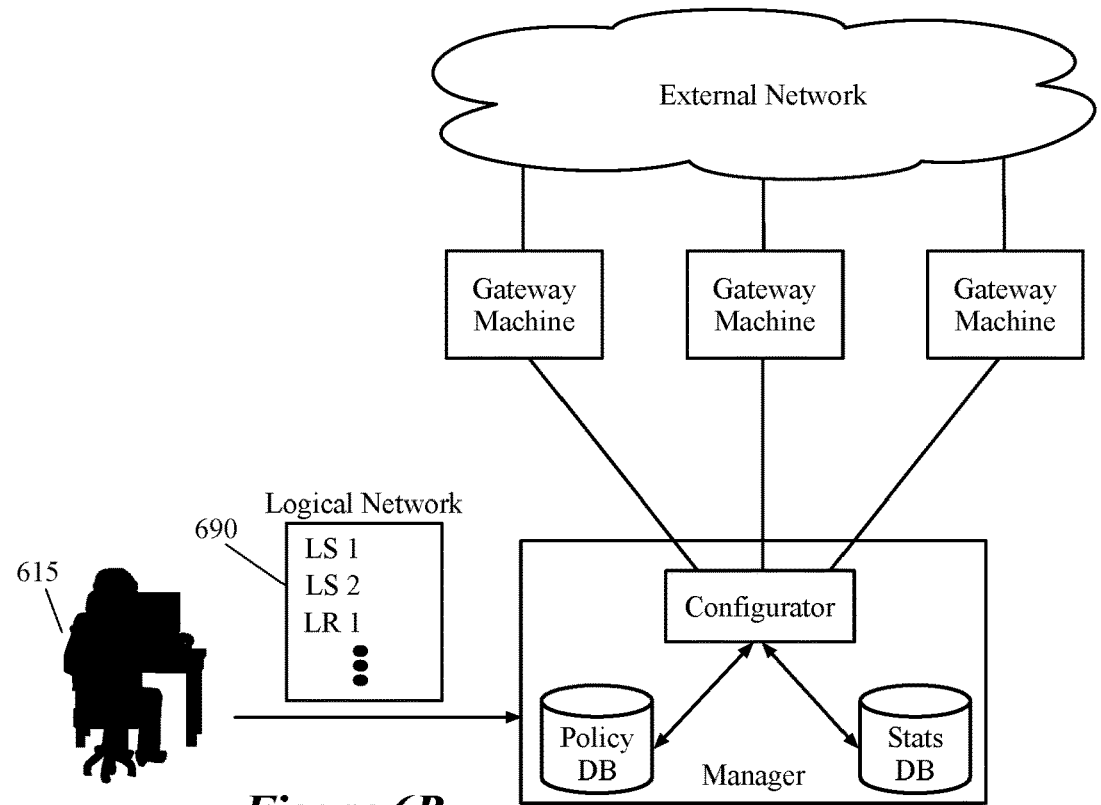

FIGS. 6A-6B illustrate a manager of a logical network that receives the logical router configuration policy and logical network's definition from one or more users and configures the logical routers of the logical network on one or more edge nodes based on the configuration policy. Configuration of other logical network elements such as logical switches on the edge nodes and other physical nodes of the hosting system is not shown in these figures for the simplicity of description. Specifically, FIG. 6A shows a user (e.g., network administrator) 610, a manager machine 630, three gateway machines 660-670, and an external network 680. The manager includes, among other modules and storages, a configurator module 640, a policy database 645, and a statistics database 650. The figure also shows a policy file 620 that is fed to the manager 630 by the user 610.

As illustrated in the figure, in some embodiments, after a user defines the policy 620 that includes a set of rules, the manager 630 stores the policy in the policy database 645. The set of rules that is provided by the user, in some embodiments, includes a rule for placing the logical routers on the edge nodes based on a bin packing algorithm. That is, some embodiments calibrate (1) each logical router's capacity (e.g., predict the resource requirements for the logical router) and (2) each edge node's capacity (e.g., into a range of bins). These embodiments then place the logical routers on the edge nodes such that an optimum number of logical routers fits into each edge node. Some embodiments categorize the logical routers into different capacity groups (e.g., compact, medium, large, etc.) after the calibration and place the logical routers on the edge nodes (e.g., when the edge nodes are also categorized into a set of groups that correspond to different logical router capacity groups).

In some embodiments, the set of rules may also include a rule that selects the next edge node in a sequential order (i.e., in the round robin approach); a rule that selects an edge node that has been least recently used; an edge node that has lowest connections (to the external networks); an edge node, through which, the lowest network traffic passes (i.e., the lowest number of packets is sent, through the edge node, to the external networks); an edge node, on which, the lowest number of logical routers (irrespective of their capacity) is configured; an edge node that has the lowest amount of aggregated capacity of configured logical routers; an edge node, on which other logical routers of the logical network (e.g., on a north-south path) have already been configured; and an edge node, on which, the least number of logical routers of other logical networks is configured (e.g., to ensure fault isolation between the tenants); or any other rules that the user defines.

As described above, each rule has a rank assigned to it in some embodiments. In some such embodiments, the configurator 645 retrieves the first ranked rule in the database 660. The configurator then analyzes the gateway machines 660-670 to determine whether any of the gateway machines matches the retrieved rule. If a machine matches the rule, the configurator configures the logical router on that machine. If none of the gateway machines matches the rule, the configurator goes down the ranked rules in the database until the configurator finds the highest ranked rule that applies to one of the edge nodes 660-670. When the next highest ranked rule that is retrieved from the database 645 applies to two or more of the edge nodes 660-670 (in an edge cluster that has many more edge nodes), the configuration 640 selects the first edge node that is being analyzed in some embodiments.

Some embodiments use the same data storage to store different databases that include different policies for different tenants of a hosting system. Some other embodiments use different data storages each of which stores the policy data that is related to each tenant. Yet, in some other embodiments, each data storage of a set of data storages stores one or more databases that keep policy data for one or more tenants of a datacenter.

The management plane of some embodiments also deploys one or more databases (in one or more data storages) that keep the necessary statistical data, based on which, the management plane decides which edge node is the best candidate for configuring the defined logical routers. That is, after the manager retrieves the highest ranked rule from the configuration policy database 645, in some embodiments, the manger looks into a statistics database 650 to determine which of the edge nodes match the retrieved rule. In other words, the configurator module 640 uses the statistics database 650 to determine the best candidate edge node based on the selection approach that is dictated by the rules received from the configuration policy database 645.

For instance, in a round robin approach, the management plane starts with the first available edge node and selects each next edge node based on the data the management plane in statistics database which keeps track of edge nodes that have not been selected yet. As another example, the database, in some embodiments, keeps track of the number of connections that each edge node have established to the external networks. This way, when the policy dictates that the best candidate is an edge node that has the least number of connections, the management plane identifies the best candidate by querying the database for an edge node with the least number of connections.

Figure 8:
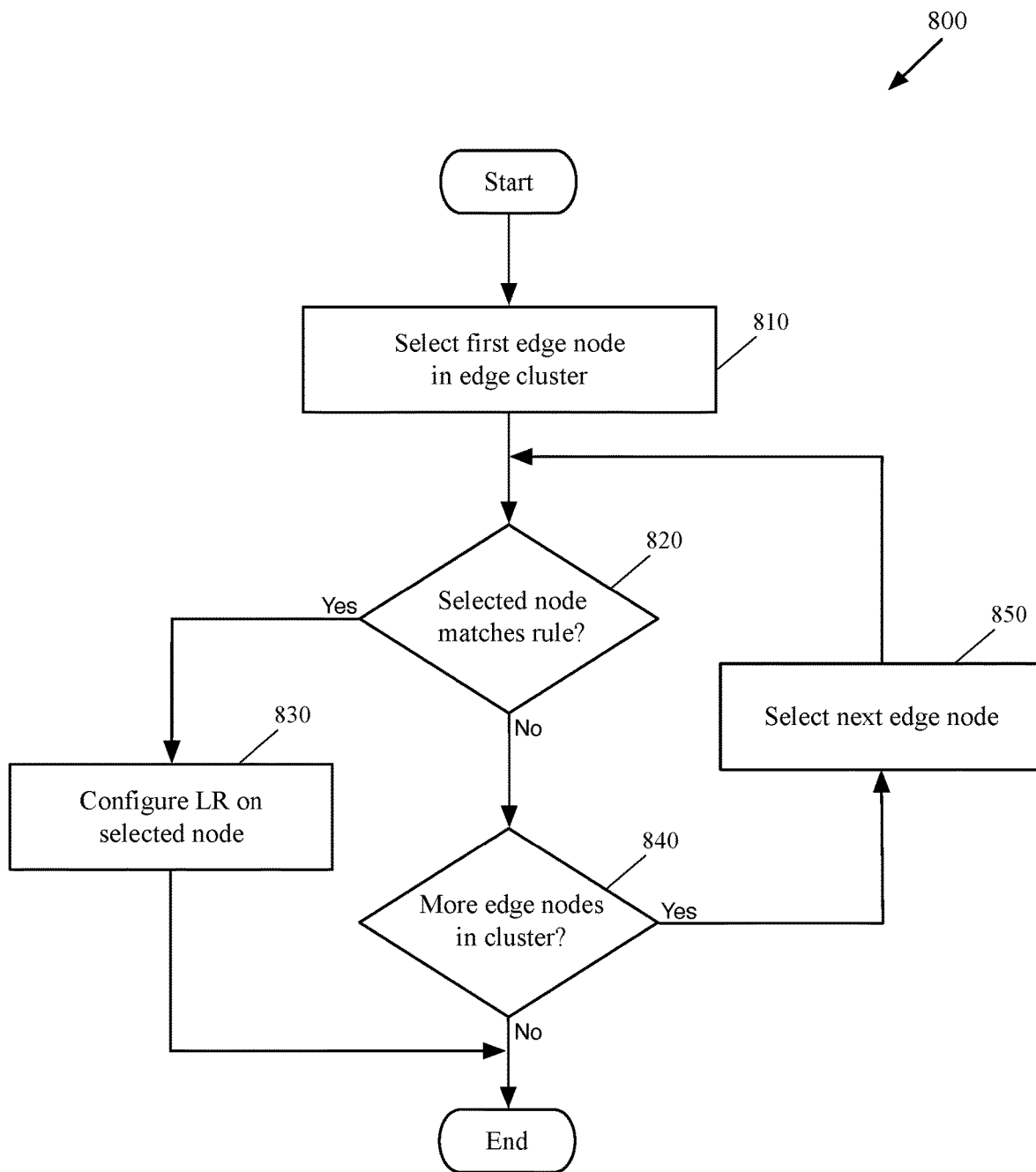
FIG. 8 conceptually illustrates a process of some embodiments that determines whether an edge node matches a selected rule, and configures a logical router on the edge node when the node satisfies the specified requirement in the rule.

In some embodiments, the management plane queries the edge nodes of the edge cluster in order to receive these statistical data and update the data kept in the statistics database 650. In some other embodiments, the management plane updates this database on a transaction basis. For example, each time the management plane configures a logical router (i.e., a service router of the logical router) on an edge node or removes a logical router from an edge node, the management plane updates the statistical data in the database. Yet, in some other embodiments, the management plane employs both of these methods. That is, the management plane updates the database with each new transaction, and at the same time, the management plane queries the edge nodes upon occurrence of an event (e.g., periodically) to receive more precise information to store in the database. In some other embodiments, the management plane does not keep the statistical information in a separate database (as shown in FIG. 8 below). In some such embodiments, the manager iteratively analyzes the available edge nodes and configures the logical router on the first available edge node that matches the configuration rule (retrieved from the configuration policy).

FIG. 6B shows a user (e.g., a datacenter's tenant) 615 defining a logical network by providing definition of each logical network element to the manager 630. More specifically, the user 615 defines, through different API calls 690, the different elements (e.g., logical switches, logical routers, logical middleboxes, etc.) of the logical network for the manager 630. Each set of API calls instructs the manger to generate configuration data for one specific element of the logical network. As shown, the API calls are for generating two logical switches LS1 and LS2, and a logical router LR (although shown as one API call for each element, in reality, more than one call may be required for each element to be created).

The manager 630, in turn, generates configuration data for each of the logical network elements and configures these elements on different physical nodes of the physical network infrastructure. As described above, in some embodiments, the logical switches are configured on one or more host machines (i.e., on the MFEs of the host machines) as well as one or more gateway machines (i.e., on the MFEs of the host machines) that connect the physical network infrastructure, on which the logical network is implemented, to external networks.

The manager 630 also configures the logical router on the host machines and gateway machines. That is, the manager first generates configuration data for a DR of the logical router and a set of SRs of the logical router based on the logical router's definition received from the user. The manager then configures the DR the MFEs of both of the host machines and gateway machines. The manger (e.g., the configurator 640 of the manager) also configures the set of SRs on the gateway machines in the manner that is described above and below. Although users 610 and 615 illustrated in FIGS. 6A and 6B are shown as two separate users, in some embodiment both of these users can be the same (e.g., a tenant of a datacenter, a network administrator of the datacenter, etc.).

Figure 7:
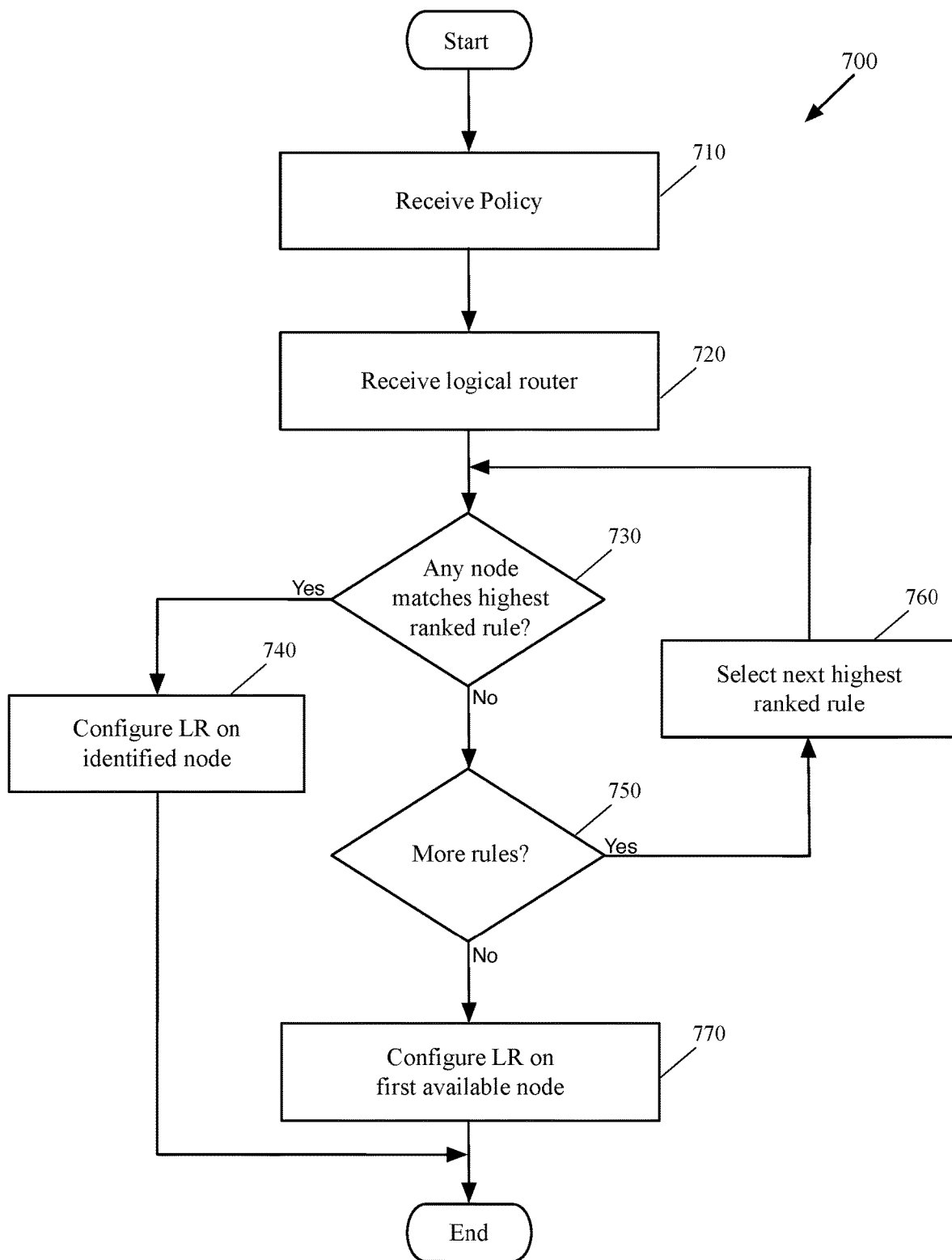
FIG. 7 conceptually illustrates a process of some embodiments that automatically selects an edge node of an edge cluster based on a configuration policy and configures a logical router (i.e., a service routing component of the logical router) on the selected edge node.

FIG. 7 conceptually illustrates a process 700 of some embodiments that automatically selects an edge node of an edge cluster based on a configuration policy, and configures a logical router (i.e., a service routing component of the logical router) on the selected edge node. In some embodiments the process is performed by a manager machine (or application) in a management cluster of a hosting system. The method starts by receiving (at 710) the configuration policy for configuring the logical routers. In some embodiments, the configuration policy for logical routers is part of a larger policy that specifies other configuration rules for other logical network elements. In some other embodiments, the configuration policy is specifically for configuring logical routers of the logical network.

As described above, the configuration policy includes a set of ranked rules each specifies a condition for an edge node that must be satisfied in order to configure a service router of the logical router on the edge node. An example of the rules includes a rule that specifies selection of an edge node on which a logical router that belongs to a different tier of the logical network is configured. Another example rule specifies that the service router be configured on an edge node that currently passes the least amount of network traffic. A third example is a rule that specifies selection of an edge node on which the least number of other service routers are configured. For instance, when there are multiple PLRs configured on multiple edge nodes and there is new PLR that should be configured in the network, the configuring manager configures the SR(s) of the new PLR on an edge node(s) that implement the least number of SRs of the different PLRs that have been previously been configured.

The process 700 then receives (at 720) a definition of a logical router. As described above, the process receives the definition of the logical router among other definitions of other logical forwarding elements from a user in order to configure a logical network topology on the physical nodes of a physical network. Although not shown in this figure, the process of some embodiments generates different routing components of the logical router based on the received definition. The process then determines (at 730) whether any node in the edge cluster matches the specification specified in the highest ranked rule of the policy. Such a determination, as was described above, can be made by looking up the related data for each edge node that is kept in one or more statistics databases. Some other embodiments make such a determination, as will be described in more detail below by reference to FIG. 8, by analyzing the edge nodes one by one and configuring the logical router on the first matched edge node. Some other embodiments utilize a combination of both methods.

When the process determines that an edge node in the edge cluster matches the specification of the highest ranked rule of the policy, the process configures (at 740) the logical router (e.g. an SR of the logical router) on the edge node. The process then ends. On the other hand, when none of the edge nodes matches the specification of the rule, the process determines (at 750) whether any more rules have left in the configuration policy that are not processed yet. When the process determines that there is a next highest ranked rule left in the policy that is not processed, the process selects (at 760) the next highest ranked rule and returns to operation 730 to determine whether any of the edge nodes matches this newly selected rule. On the other hand, when the process determines that there is no more rule left in the policy, the process of some embodiments configures (at 770) the logical router on the first available edge node. In some embodiments, the process returns an error message when the process does not find any available gateway machine on which to configure the logical router.

The specific operations of the process 700 may not be performed in the exact order shown and described. The specific operations may not be performed in one continuous series of operations, and different specific operations may be performed in different embodiments. For example, some embodiments, after receiving the logical router's definition (at 720) and generating the logical router's different routing components, select the first SR of the logical router. These embodiments, then perform the rest of the operation 730-760. After that, however, instead of configuring the LR (at 770) on the identified node, these embodiments configure the first SR on the identified node and then determine whether the LR has any more SRs.

If there are more SRs, these embodiments select the next SR and return to operation 730 at which the process determines whether the newly selected SR can be configured on any of the nodes and so on. The process in these embodiments ends when there are no more SRs left to examine. Additionally, one of ordinary skill in the art would realize that the process 700 could be implemented using several sub-processes, or as part of a larger macro process. For example, the operations 730 and 740 are performed by the process illustrated in FIG. 8 and described below in some embodiments.

FIG. 8 conceptually illustrates a process 800 of some embodiments that determines whether an edge node matches a selected rule, and configures a logical router on the edge node when the node satisfies the specified requirement in the rule. The manager of some embodiments performs this process when some or all of the statistical data related to the edge cluster is not stored at and/or accessible by the manager. The process starts (at 810) by identifying the first edge node of the edge cluster. In some embodiments, only a particular set of edge nodes of the edge cluster is assigned to each tenant, or set of tenants. In some other embodiments, every edge node of the edge cluster can be used by one or more tenants of the hosting system. That is, an SR of a particular PLR that connects a logical network of a tenant to an external network (when each logical network is connected to the external networks through a particular PLR) can be configured on any of the edge nodes of the edge cluster. In some such embodiments, however, if the particular PLR has more than one SR, each SR has to be configured on a separate edge node.

The process then determines (at 820) whether the selected node (whether selected from a specific set of nodes or from all the nodes of the edge cluster) matches the rule of the configuration policy that is being processed. When the process determines that the selected node satisfies the requirement that is specified in the rule, the process configures (at 830) the logical router (i.e., the SR of the logical router) on the selected node. The process then ends. On the other hand, when the process determines that the selected node does not satisfy the specified requirement by the rule, the process determines (at 840) whether there is any other edge node left in the edge cluster (or in a particular set of edge nodes that is assigned to the logical network).

When the process determines that there is an edge node left (in the edge cluster or a particular set of edge nodes), the process selects (at 850) the next edge node and returns to operation 820 to determine whether the next selected node matches the rule. On the other hand, when the process determines that no more edge node is left in the edge cluster, the process ends. In some embodiments, when the process does not find any edge node for the specified rule after processing all of the edge nodes, the process returns an error message, informing the user that the logical router cannot be configured for the logical network.

The specific operations of the process 800 may not be performed in the exact order shown and described. The specific operations may not be performed in one continuous series of operations, and different specific operations may be performed in different embodiments. Additionally, one of ordinary skill in the art would realize that the process 800 could be implemented using several sub-processes, or as part of a larger macro process.

The configuration policy, as described above, includes a set of ranked rules that each specifies a condition for an edge node that must be satisfied in order to configure a service router of the logical router on the edge node. An example of the rules includes a rule that requires adjacency of the logical routers that belong to different tiers of the same logical network. When two logical routers are implemented on the same gateway machine, a packet does not have to be tunneled to a different gateway machine when one of the logical routers sends the packet to the other logical router. As such, in order to improve the network efficiency, the user may define a rule that requires adjacency of implementation of the logical routers, which are situated on different layers of the logical network, on a single gateway machine. In order to better understand this concept, several examples of a multi-tier logical network topology and implementing different logical routers of a logical network on the same gateway machine are described below by reference to FIGS. 9-13.

Figure 9:
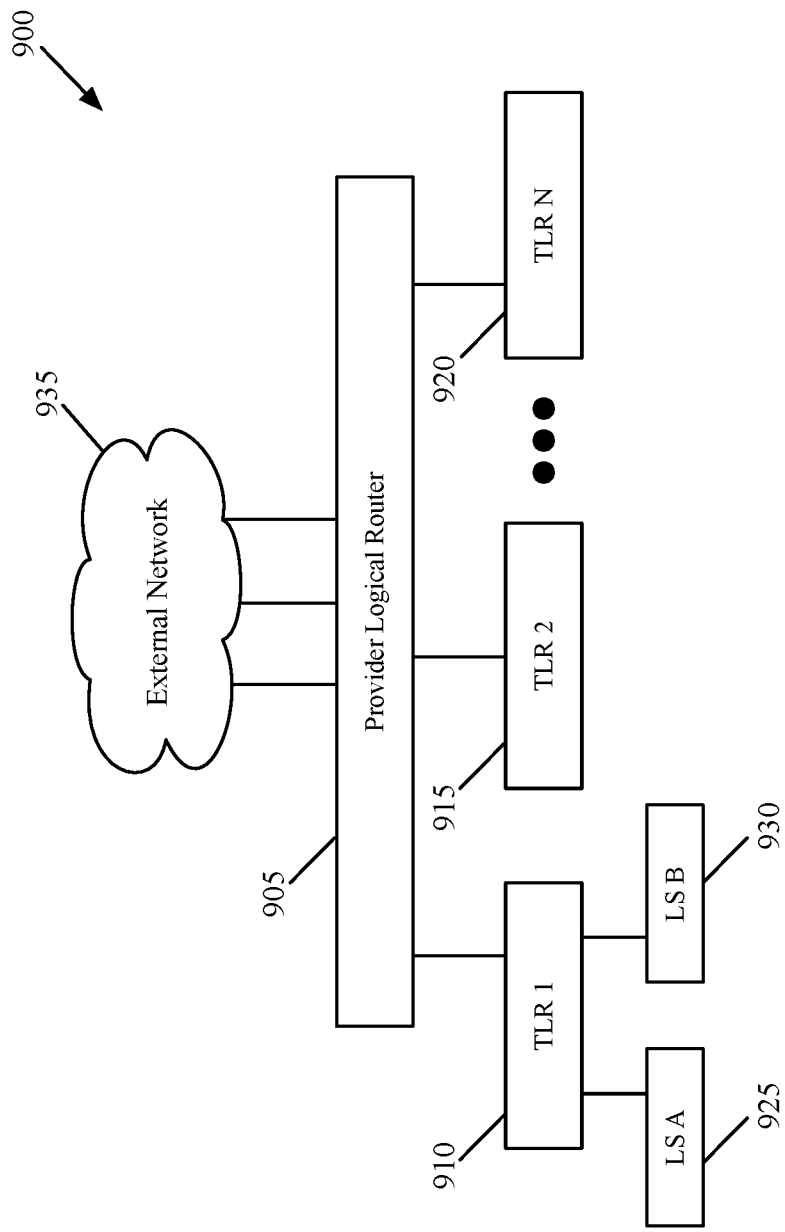
FIG. 9 conceptually illustrates a multi-tier logical network with logical routers that are situated in different tiers of the logical network.

The previous examples illustrate only a single tier of logical router. For logical networks with multiple tiers of logical routers, some embodiments may include both DRs and SRs at each level, or DRs and SRs at the upper level (the PLR tier) with only DRs at the lower level (the TLR tier). FIG. 9 conceptually illustrates a multi-tier logical network 900 of some embodiments, with FIGS. 10 and 11 illustrating two different management plane views of the logical networks.

FIG. 9 conceptually illustrates a logical network 900 with two tiers of logical routers. As shown, the logical network 900 includes, at the layer 3 level, a provider logical router 905 and several tenant logical routers 910-920. The first tenant logical router 910 has two logical switches 925 and 930 attached, with one or more data compute nodes coupling to each of the logical switches (not shown in the figure). For simplicity of description, only the logical switches attached to the first TLR 910 are shown, although the other TLRs 915-920 would typically have logical switches attached to them as well (e.g., logical switches to which data compute nodes couple).

In some embodiments, any number of TLRs may be attached to a PLR such as the PLR 905. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR. Part of the routing table for a PLR includes routes for all of the logical switch domains of its TLRs, so attaching numerous TLRs to a PLR creates several routes for each TLR just based on the subnets attached to the TLR. The PLR 905, as shown in the figure, provides a connection to the external physical network 935; some embodiments only allow the PLR to provide such a connection, so that the datacenter provider can manage this connection. Each of the separate TLRs 910-920, though part of the logical network 900, are configured independently (although a single tenant could have multiple TLRs if the tenant so chose).

Figure 10:
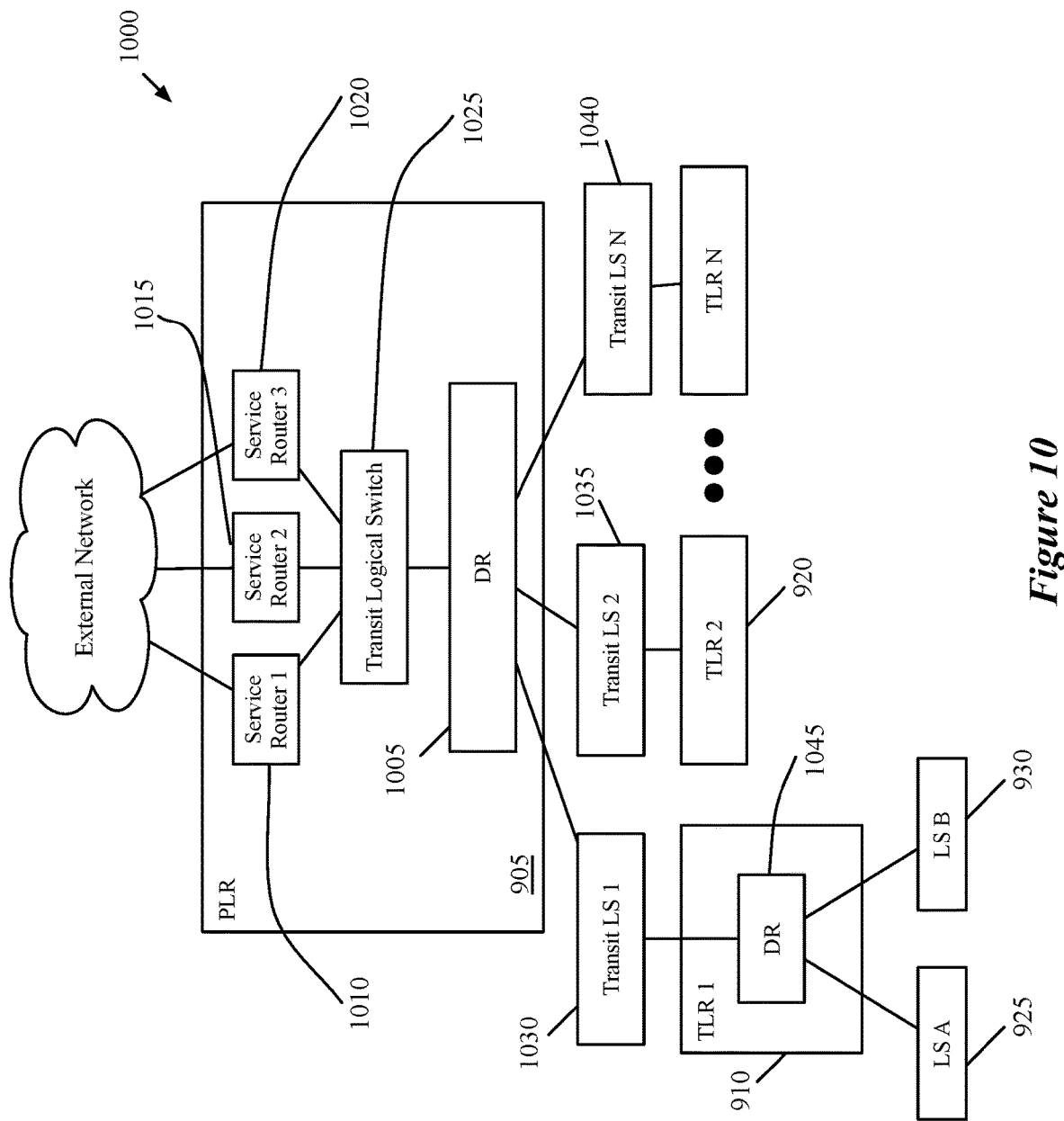
FIG. 10 illustrates the management plane view for the logical topology of FIG. 9 when a Tenant Logical Router (TLR) in the logical network is completely distributed.
Figure 11:
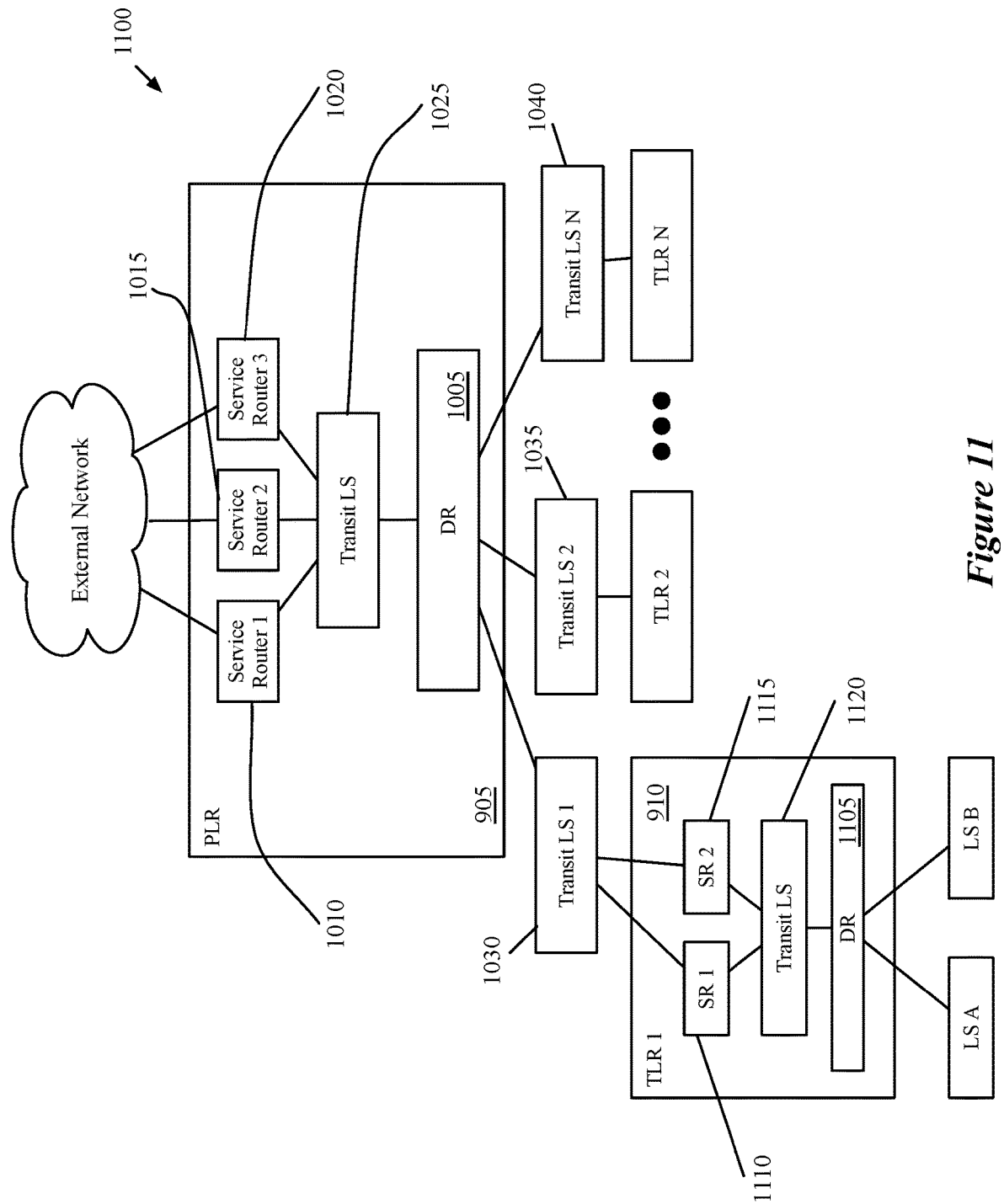
FIG. 11 illustrates the management plane view for the logical topology of FIG. 9 when the TLR in the logical network includes at least one service routing component (e.g., because stateful services that cannot be distributed are defined for the TLR).

FIGS. 10 and 11 illustrate different possible management plane views of the logical network 900, depending on whether or not the TLR 905 includes a service routing component. In these examples, the routing aspects of the TLR 905 are always distributed using a DR. However, if the configuration of the TLR 905 includes the provision of stateful services, then the management plane view of the TLR (and thus the physical implementation) will include active and standby SRs for these stateful services.

FIG. 10 illustrates the management plane view 1000 for the logical topology of FIG. 9 when the TLR 905 is completely distributed. For simplicity, only details of the first TLR 910 are shown; the other TLRs will each have their own single DRs, as well as set of SRs in some cases. As shown in the figure, the PLR 905 includes a DR 1005 and three SRs 1010-1020, connected together by a transit logical switch 1025. In addition to the transit logical switch 1025 within the PLR 905 implementation, the management plane also defines separate transit logical switches 1030-1040 between each of the TLRs and the DR 1005 of the PLR. In the case in which the TLR 910 is completely distributed (FIG. 10), the transit logical switch 1030 connects to a DR 1045 that implements the configuration of the TLR 910 (i.e., TLR 910 will not have a separate SR). Thus, when a packet sent to a destination in the external network by a data compute node attached to the logical switch 925, the packet will be processed through the pipelines of the logical switch 925, the DR 1045 of TLR 910, the transit logical switch 1030, the DR 1005 of the PLR 905, the transit logical switch 1025, and one of the SRs 1010-1020. In some embodiments, the existence and definition of the transit logical switches 1025 and 1030-1040 are hidden from the user that configures the network through the API (e.g., a network administrator), with the possible exception of troubleshooting purposes.

In some embodiments, when the second-tier logical router (e.g., TLR 910 in the illustrated example) does not provide stateful services, the management plane does not generate a service routing component for the logical router and therefore, does not configure a service router on any of the edge nodes. In other words, in some embodiments, the management plane only configures the SR(s) of the PLR on the edge node(s) of the edge cluster. The management plane of some embodiments also configures the SRs of any other second-tier logical router that provides stateful services, on the edge cluster. As will be described in more detail below, in some such embodiments a user can define a configuration policy that specifies any second-tier logical router that provides stateful services must be configured on an edge node adjacent to the first-tier logical router (e.g., the SR of TLR 920 should be implemented on an edge node that implements one of the SRs of the PLR 905).

FIG. 11 illustrates the management plane view 1100 for the logical topology 900 when the TLR 905 has at least one service routing component (e.g., because stateful services that cannot be distributed are defined for the TLR). In some embodiments, stateful services such as firewalls, NAT, load balancing, etc. are only provided in a centralized manner. Other embodiments allow for some or all of such services to be distributed, however. As with the previous figure, only details of the first TLR 910 are shown for simplicity; the other TLRs may have the same defined components (DR, transit LS, and a set of SRs) or have only a DR as in the example of FIG. 10). The PLR 905 is implemented in the same manner as in the previous figure, with the DR 1005 and the three SRs 1010-1020, connected to each other by the transit logical switch 1025. In addition, as in the previous example, the management plane places the transit logical switches 1030-1040 between the PLR and each of the TLRs.

The partially centralized implementation of the TLR 910 includes a DR 1105 to which the logical switches 925 and 930 (LS A and LS B) attach, as well as two SRs 1110 and 1115. As in the PLR implementation, the DR and the two SRs each have interfaces to a transit logical switch 1120. This transit logical switch serves the same purposes as the transit logical switch 1025, in some embodiments. For TLRs, some embodiments implement the SRs in active-standby manner, with one of the SRs designated as active and the other designated as standby. Thus, so long as the active SR is operational, packets sent by a data compute node attached to one of the logical switches 925 and 930 will be sent to the active SR rather than the standby SR.

The above figures illustrate the management plane view of logical routers of some embodiments. In some embodiments, an administrator or other user provides the logical topology (as well as other configuration information) through a set of APIs. This data is provided to a management plane, which defines the implementation of the logical network topology (e.g., by defining the DRs, SRs, transit logical switches, etc.). In addition, in some embodiments, the management plane associates each logical router (e.g., each PLR or TLR) with a set of physical machines (e.g., a pre-defined group of machines in an edge cluster) for deployment.

For purely distributed routers, such as the TLR 905 as implemented in FIG. 10, the set of physical machines is not important, as the DR is implemented across the managed forwarding elements that reside on hosts along with the data compute nodes that connect to the logical network. However, if the logical router implementation includes SRs, then these SRs will each be deployed on specific physical machines. In some embodiments, the group of physical machines is a set of machines designated for the purpose of hosting SRs (as opposed to user VMs or other data compute nodes that attach to logical switches). In other embodiments, the SRs are deployed on machines alongside the user data compute nodes.

In some embodiments, the user definition of a logical router includes a particular number of uplinks. An uplink, in some embodiments, is a northbound interface of a logical router in the logical topology. For a TLR, its uplinks connect to a PLR (all of the uplinks connect to the same PLR, generally). For a PLR, its uplinks connect to external routers. Some embodiments require all of the uplinks of a PLR to have the same external router connectivity, while other embodiments allow the uplinks to connect to different sets of external routers. Once a group of machines (i.e., the edge cluster) for the logical router is specified, if SRs are required for the logical router, the management plane automatically assigns each of the uplinks of the logical router to an edge machine in the edge cluster based on the configuration policy. The management plane then creates an SR on each of the edge machines to which an uplink is assigned. Some embodiments allow multiple uplinks to be assigned to the same edge machine, in which case the SR on the machine has multiple northbound interfaces.

As mentioned above, in some embodiments the SR may be implemented as a virtual machine or other container, or as a VRF context (e.g., in the case of DPDK-based SR implementations). In some embodiments, the choice for the implementation of an SR may be based on the services chosen for the logical router and which type of SR best provides those services.

In addition, the management plane of some embodiments creates the transit logical switches. For each transit logical switch, the management plane assigns a unique virtual network identifier (VNI) to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous TLRs (e.g., the network topology 900), each of which may have its own transit logical switch. That is, in FIG. 11, transit logical switch 1025 within the PLR implementation, transit logical switches 1030-1040 between the PLR and the TLRs, and transit logical switch 1120 (as well as the transit logical switch within the implementation of any of the other TLRs) each requires a unique subnet (i.e., a subdivision of the IP network).

Some embodiments place various restrictions on the connection of logical routers in a multi-tier configuration. For instance, while some embodiments allow any number of tiers of logical routers (e.g., a PLR tier that connects to the external network, along with numerous tiers of TLRs), other embodiments only allow a two-tier topology (one tier of TLRs that connect to the PLR). In addition, some embodiments allow each TLR to connect to only one PLR, and each logical switch created by a user (i.e., not a transit logical switch) is only allowed to connect to one PLR or one TLR. Some embodiments also add the restriction that southbound ports of a logical router must each be in different subnets. Thus, two logical switches may not have the same subnet if connecting to the same logical router. Lastly, some embodiments require that different uplinks of a PLR must be present on different gateway machines. It should be understood that some embodiments include none of these requirements, or may include various different combinations of the requirements.

Figure 12:
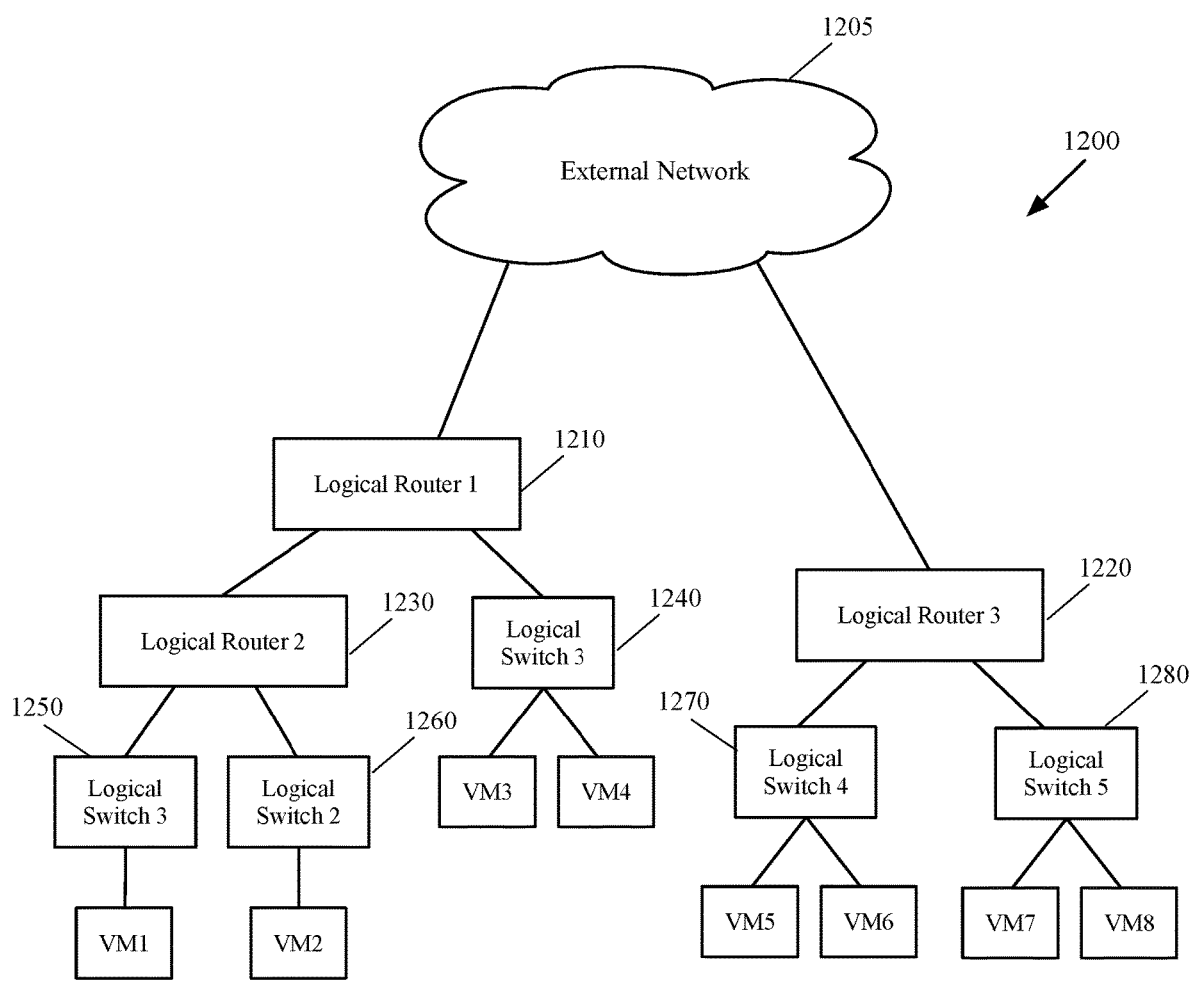
FIG. 12 illustrates a logical network topology that is connected to an external network through a set of logical routers that are positioned in the same or different layers of the logical topology.

FIG. 12 illustrates a logical network topology 1200 that is connected to an external network through a set of logical routers. More specifically, this figure shows that a set of data compute nodes (e.g., virtual machines) of a logical network (e.g., a logical network that belongs to a tenant of the datacenter) can exchange data with an external network through multiple logical routers of the logical network that are placed in the same or different layers (tiers) of the logical topology. The figure includes an external network (e.g., Internet) 1205, two logical routers 1210 and 1220 that are directly connected to the external network (i.e., first-tier logical routers), a second-tier logical router 1230, logical switches 1240-1280, and virtual machines VM1-VM8.

As illustrated in the figure, the first-tier logical router 1210 (e.g., a PLR of the logical network) has an interface that is connected to the external network 1205 (e.g., through a physical hardware router), an interface for the logical router 1230, and an interface for the logical switch 1240. Logical switch 1240 logically connects the two virtual machines VM3 and VM4 to the other elements of the logical network as well as other physical and/or logical network elements (through the external network 1205). The logical router 1230 (e.g., a TLR of the logical network) has a northbound interface for the logical router 1210, a southbound interface for the logical switch 1250, and another southbound interface for the logical switch 1260. These logical switches logically connect VM1 and VM2, respectively, to the other network elements (local and external). The logical router 1220 (e.g., a PLR) has a northbound interface that is connected to the external network 1205 (e.g., through the same or different hardware router to which the logical router 1210 is connected) and two southbound interfaces for the logical switches 1270 and 1280 that logically connect VM5-VM8 to the logical network.

Each of the virtual machines communicates with the other virtual machines in the logical network and other network elements in the external network through a particular subset of logical switches and routers among the illustrated logical switches and routers of the figure. For example, when virtual machine VM1 wants to send a packet to the virtual machine VM6, the packet is sent to and processed by a managed forwarding element that (1) runs in the same host machine as VM1 and (2) implements a logical port of the logical switch 1250, to which VM1 is logically connected. The MFE processes the packet by performing forwarding processing for the logical switch 1250, DR of logical router 1230, DR of logical router 1220, and logical switch 1270.

After such forwarding processing, the MFE identifies the MFE on which the destination tunnel endpoint is implemented (could be the same MFE or another MFE that runs on a different host machine). The identified MFE implements the logical port of the logical switch 1270, to which VM6 is connected. As such, if VM6 executes on the same host machine as VM1, the first MFE performs the forwarding processing for the logical port of logical switch 1270, to which VM6 is connected and sends the packet to VM6. On the other hand, if VM6 runs on a different host machine, the first MFE tunnels the packet to the identified MFE which implements the logical port of logical switch 1270, to which VM6 is connected. In this case, the identified MFE, in turn, performs the forwarding processing for the logical port and sends the packet to the virtual machine VM6.

As another example when VM4 sends a packet to a remote virtual or physical machine (through the external network 1205), an MFE that executes in the same host machine (e.g., in the hypervisor of the host machine) as VM4 receives the packet and performs the forwarding processing on the packet for the logical switch 1240 and the logical router 1210 (e.g., the DR of the logical router 1210).

The DR (and TLS) of the logical router then realizes that the SR (e.g., active SR) of the logical router is implemented by a gateway machine that is connected to the external network. The packet is then tunneled to the gateway machine, which in turn performs additional forwarding processing (by an MFE that implements the destination tunnel endpoint that receives the packet) and sends the packet to the SR of the logical router 1210. The SR then sends the packet to a physical router that routes the packet towards its destination through the external network.

The logical routers 1210 and 1220 are different PLRs that connect the network elements of the same logical network to the external network in some embodiments. The logical routers 1210 and 1220 can also be PLRs for different logical networks that are implemented by the physical network infrastructure in some other embodiments. The logical router 1230, on the other hand, is a tenant router (TLR) that connects to the external network only through the PLR 1210. As such, the network would be more efficient if the SRs of the logical routers 1210 and 1230 that are different tier routers of the same logical network be implemented on the same edge node.

That is, when a packet is sent from the SR of the logical router 1230 to the DR of the logical router 1210 (through a TLS), the network is more efficient if the packet is processed on the same edge node (i.e., gateway machine) instead of being sent from an edge node that implements the first SR to another edge node that implements the second SR. Therefore, a user can define a configuration policy that requires the SRs of the different tier logical routers be configured next to each other (i.e., be configured on the same gateway machine).

Figure 13A:
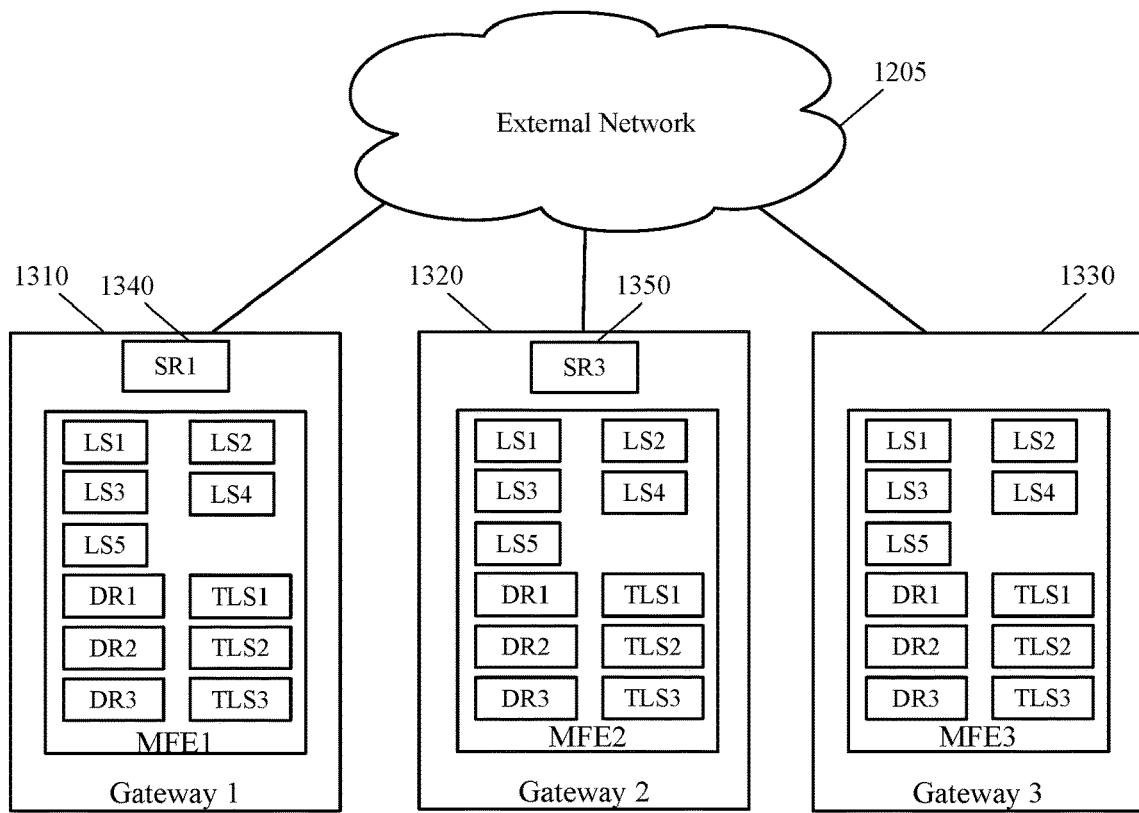
FIGS. 13A-13B illustrate the physical implementation of the logical network elements shown in FIG. 12, on different edge nodes of an edge cluster.
Figure 13B:
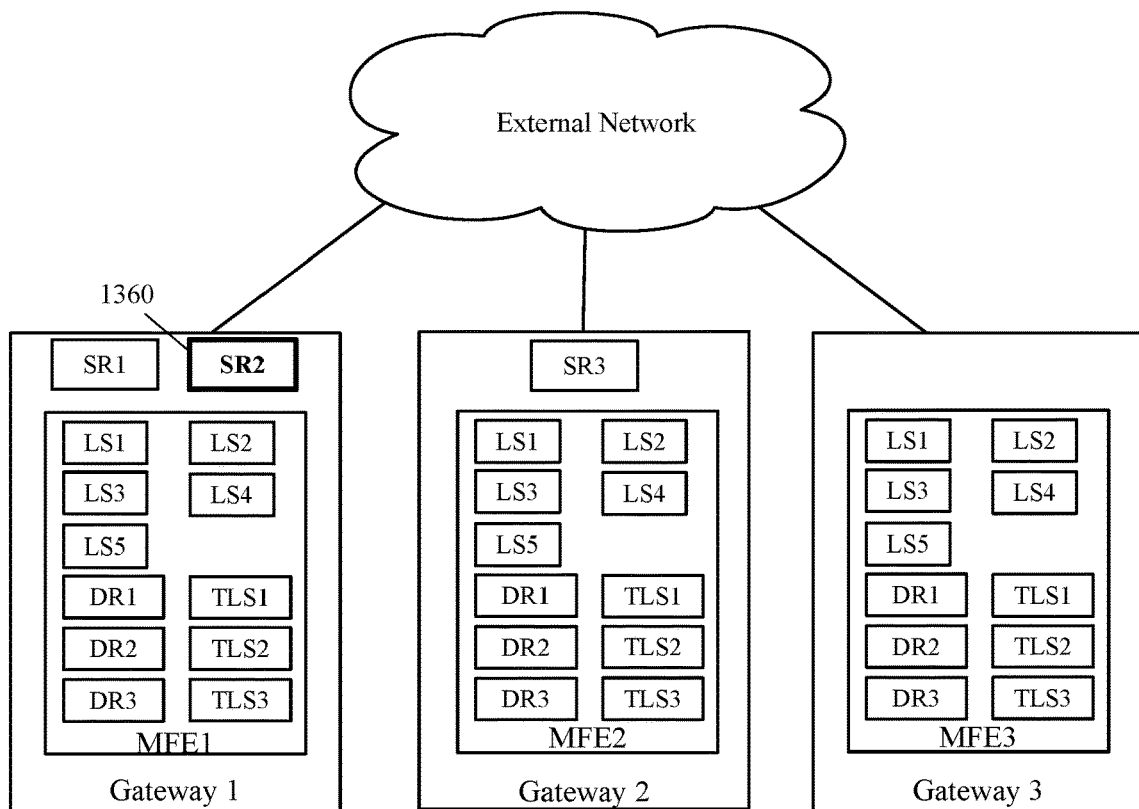

FIGS. 13A-13B illustrate the physical implementation of the logical network elements shown in FIG. 12, on different edge nodes of an edge cluster. The figure does not show the implementations of the logical entities on other host machines for simplicity of the description. FIG. 13A includes the external network 1205 and three gateway machines 1310-1330. Each gateway machine executes an MFE (e.g., in a hypervisor of the gateway machine) that implements the logical forwarding elements (i.e., logical switches and routers) of the logical network. That is, each MFE implements the logical switches LS1-LS3, the distributed components DR1-DR3 of the logical routers, and the transit logical switches TLS1-TLS2. Each MFE also implements the TLS between the active SR of the TLR (i.e., SR2) and the DR of the first PLR (i.e., DR1), which is not shown in the figure.

As illustrated in FIG. 13A, the gateway machine 1310 also executes SR 1340 which is the service routing component of the first PLR (LR1), while the gateway machine 1320 executes SR 1350 which is the service routing component of the second PLR (LR3). Each of these service routers connects the logical network to the external network. Each of these SRs is configured on the edge nodes based on a set of policy rules that are defined by a user and stored in the policy configuration database. One of the rules of the configuration policy defined by the user is that when there is a multi-tier logical topology, the system must configure the SRs (e.g., active SRs) of the logical routers on the same edge node (as long as the same edge node has the capacity for such configuration).

Therefore, when the user defines a second-tier logical router LR2 (through one or more APIs), the management plane of some embodiments generates the different components of the logical router and looks at the configuration policy to determine on which edge node the SR of LR2 should be configured. After analyzing the configuration policy (stored in the configuration database), the management plane realizes that the highest ranked related rule specifies that a second-tier logical router has to be configured adjacent to the SR of the first-tier logical router (e.g., one of the SRs of the logical router LR1, which connects to the external network).

FIG. 13B illustrates the same elements that are shown in FIG. 13A with the exception that in this figure, gateway machine 1310 is also executing the SR 1360, which is the SR of the second-tier logical router LR2. As shown in the figure, the management plane has determined that the gateway machine 1310 is the ideal edge node for implementing SR2 since this machine is also implementing SR1. The management plane has made such a determination based on the information that is stored in the configuration database as well as the information that is stored in the statistics database.

That is, the configuration database (e.g., stored in a data storage on a manager computer) specifies that the SRs have to be adjacent and the statistics database (e.g., stored in the same or different data storage on the manager computer) identifies the gateway machine 1310 as the edge node that implements the service router of the first PLR (i.e., LR1). As described above, the manager computer of some embodiments does not store a statistics database that identifies the edge nodes. In some such embodiments, the manager analyzes each edge node to identify the proper edge node on which to configure the logical router.

In the illustrated example, the configuration policy might have two or more different rules for configuring the logical routers on the edge nodes, each of which may apply to the current logical router configuration, and each of which may point to a different edge node. For instance, a first rule of the policy may specify that logical routers should be configured adjacent to each other (when they belong to different tiers of the same logical network). At the same time, a second rule in the configuration policy might specify that each new logical router should be configured on an edge node that implements the least number of logical routers (i.e., an edge node that executes the least number of SRs).

In such a circumstance, the management plane of some embodiments decides on which edge node to configure the logical router based on the ranking of the rules in the configuration database. For example, in the illustrated figure, if the adjacency rule has a higher ranking, the management plane configures SR2 on the gateway machine 1310 (as shown in the figure). On the other hand, if an edge node with the least set up SR has a higher priority, the management plane configures SR2 on the gateway machine 1330, since this machine, as shown, currently does not execute any SR of any logical router of the logical network.

Some embodiments load balance the logical routers that are configured on the different edge nodes of an edge cluster. That is, in some embodiments, the management plane, based on occurrence of a certain event (e.g., user request, lapse of certain time period, node failure, configuration policy update, etc.) identifies the logical routers that are implemented by each edge node, and based on the configuration policy, reassigns the different logical routers to different edge nodes. For instance, when an edge node fails or shuts down, the management plane of some embodiments automatically reassigns the logical routers (among other logical entities) between the edge nodes that are still active in the edge cluster.

Figure 14:
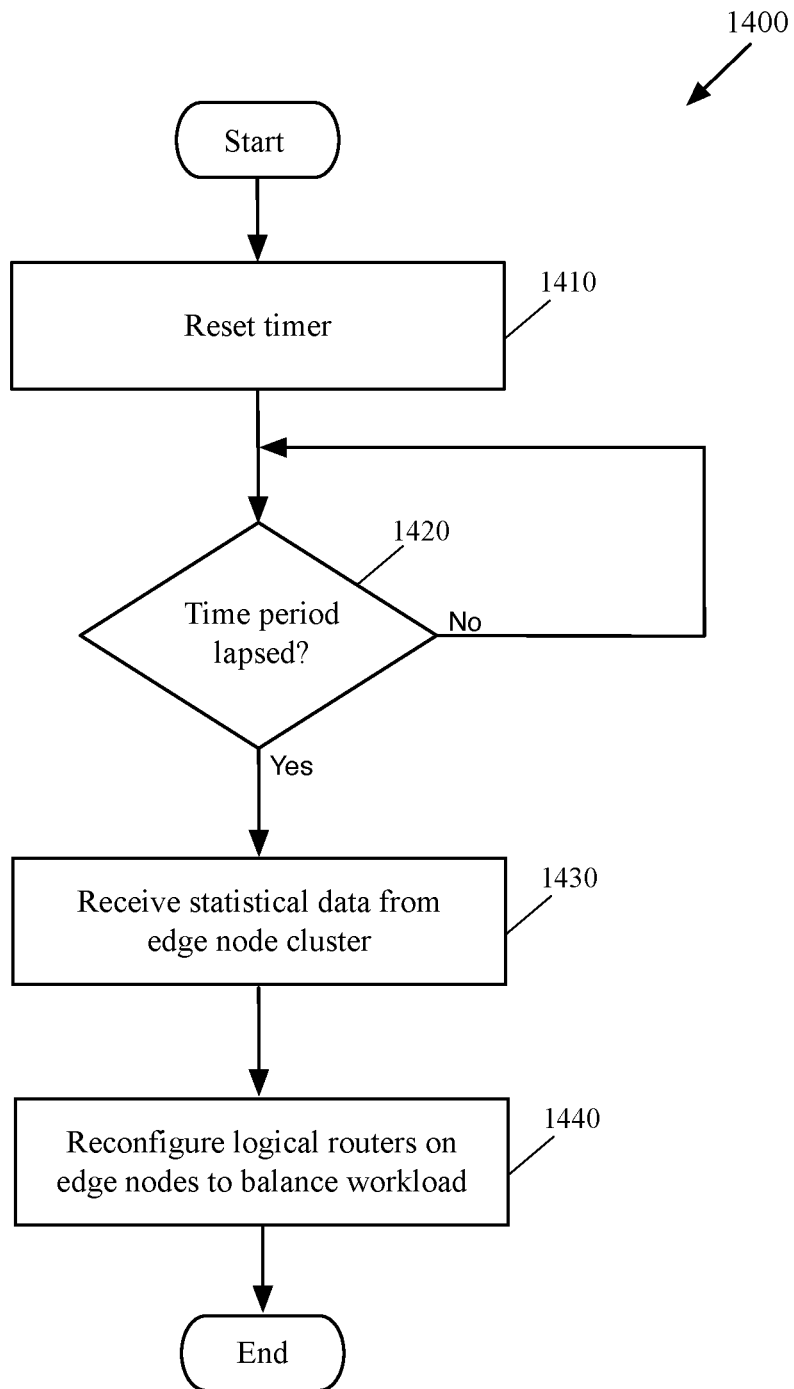
FIG. 14 conceptually illustrates a process of some embodiments that load balances the implementations of different logical routers of one or more logical networks among the different edge nodes of an edge cluster.

FIG. 14 conceptually illustrates a process 1400 of some embodiments that load balances the implementations of different logical routers of one or more logical networks among the different edge nodes of an edge cluster. Although in the illustrated figure, the process is activated in certain time intervals, as described above, the triggering event for the process to be activated can be different events in different embodiments (e.g., addition or removal of a certain number of logical routers, failure of an edge node, etc.). The process 1400 is performed by the management plane (e.g., a manager machine of a central management cluster of a datacenter) in some embodiments.

The process 1400 starts by resetting (at 1410) a timer. The process then determines (at 1420) whether a certain time period is lapsed. If the time period is not lapsed the process loops back and waits till the time is lapsed. When the process determines that the certain time period (e.g., a predefined time period) is lapsed, the process receives (at 1420) the statistical data about the number and capacity of the logical routers that are configured on each edge node. In some embodiments the process receives this information from a database such as the statistics database 650 shown in FIG. 6 which stores all the statistical data of every edge node of the edge cluster. In some other embodiments, the process selects each edge node one by one and retrieves the statistical data about the logical routers that are configured on the edge nodes directly.

The process then reconfigures (at 1430) the logical routers on the active edge nodes. The process of some embodiments reconfigures the logical routers based on the configuration policy that is defined for the process. That is, the process starts with the first logical router (e.g., the first SR of the logical router) and based on the rules defined in the policy configures the logical router on an edge node. The process then iteratively configures each next logical router based on the defined policy and the statistical data of the edge nodes until all of the logical routers are configured on the edge nodes.

The specific operations of the process 1400 may not be performed in the exact order shown and described. For example, instead of waiting for a certain period of time to lapse in order to start reconfiguring the logical routers, some embodiments reconfigure the logical routers when a user updates the configuration policy. For example, when a user adds a new rule to the configuration policy, some embodiments activate the above-described process. Some other embodiments activate the process only when a new configuration policy (with a new set of rules) replaces the previously defined configuration policy. As described above, other triggering events for reconfiguring the logical routers could be different in different embodiments. For example, some embodiments activate the process each time a defined number of logical routers is added to the logical network. Some other embodiments activate the process each time an edge node fails (or is turned off).

The specific operations may not be performed in one continuous series of operations, and different specific operations may be performed in different embodiments. Additionally, one of ordinary skill in the art would realize that the process 1400 could be implemented using several sub-processes, or as part of a larger macro process.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
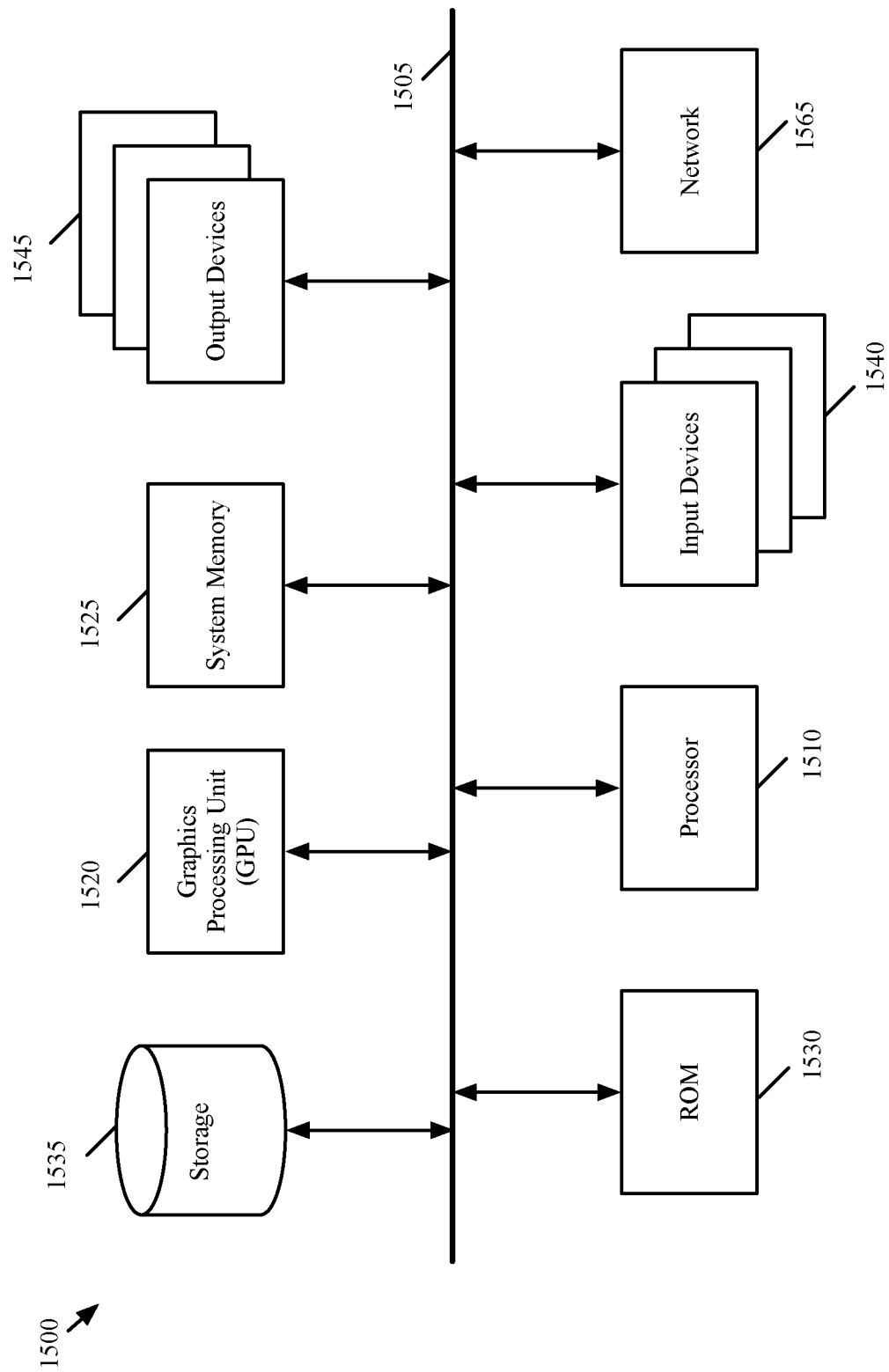
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash memory device, etc., and its corresponding drive) as the permanent storage device. Like the permanent storage device 1535, the system memory 1525 is a read-and-write memory device. However, unlike storage device 1535, the system memory 1525 is a volatile read-and-write memory, such a random access memory. The system memory 1525 stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alpha-numeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 5, 7, 8, 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for performing stateful services for a logical network in a multi-tenant datacenter hosting a plurality of logical networks, the method comprising:
   identifying, for a particular tenant, at least one stateful service to perform on data messages between a first logical network of the particular tenant and at least a second other network;
   from a cluster of edge gateways, selecting an edge gateway to serve as the edge gateway to connect the first logical network to the second network, said selection based on an edge gateway selection rule from a set of gateway selection rules, the edge gateway selection rule comprising a set of one or more edge gateway selection criteria;
   configuring the selected edge gateway as a centralized routing component of a particular logical router for the particular tenant, the centralized routing component performing the stateful service on data messages between the first logical network and the second networks; and
   configuring the selected edge gateway and at least one forwarding element connected to a set of data compute nodes of the first logical network to implement a distributed routing component of the particular logical router.

2. The method of claim 1, wherein the centralized routing component is a service routing component of the particular logical router, while the distributed routing component is a routing component that forwards, to and from the service routing component, data messages entering and exiting the first logical network.

3. The method of claim 1, wherein configuring the selected edge gateway to implement the distributed routing component of the particular logical router comprises configuring a forwarding element executing on the selected edge gateway to implement the distributed routing component.

4. The method of claim 1, wherein the selected edge gateway is an active, first edge gateway, the method further comprising:
   selecting a second edge gateway to serve as a standby edge gateway to connect the first logical network to the second network and to perform the stateful service on data messages between the first logical network and the second networks; and
   configuring the standby, second edge gateway as a standby centralized routing component of the particular logical router to perform the stateful service on data messages between the first logical network and the second network when the first edge gateway is unavailable.

5. The method of claim 1, wherein the selected edge gateway is a first edge gateway, the particular tenant is a first tenant, the particular logical router is a first logical router, the stateful service is a first stateful service, and the first logical network is a first tenant logical network, the method further comprising:
   identifying, for a second tenant, a second stateful service to perform on data messages between a second logical network of the second tenant and the second network;
   selecting the first edge gateway to serve as a standby edge gateway to connect the second tenant logical network of the second tenant to the second network and to perform the second stateful service on data messages between the second tenant logical network and the second network; and
   configuring the first edge gateway as a standby centralized routing component of the second logical router to perform the second service on data messages between the second tenant logical network and the second network when a second edge gateway configured to perform the second stateful service on data messages between the second tenant logical network and the second network is unavailable.

6. The method of claim 1 further comprising receiving a configuration policy comprising the set of gateway selection rules defined by an administrator of the particular tenant.

7. The method of claim 6, wherein the gateway selection rule set comprises a plurality of rules and the edge gateway selection rule is a first rule for selecting an active edge gateway, the method further comprising selecting a standby, second edge gateway according to a second, different rule of the gateway selection rule set for selecting a standby edge gateway.

8. The method of claim 6, wherein the gateway selection rule set is assigned to the particular tenant and the set of edge gateway selection criteria comprises at least one of a physical constraint, a product constraint, and a tenant defined constraint.

9. The method of claim 8, wherein the set of edge gateway selection criteria specifies that a logical router of the particular tenant may not coexist on the same edge gateway with a logical router of another tenant.

10. The method of claim 6, wherein the set of edge gateway selection criteria comprises a set of load balancing criteria, wherein selecting the edge gateway comprises selecting the edge gateway according to the edge gateway selection rule and real time statistical data.

11. The method of claim 6, wherein selecting the edge gateway further comprises (i) before selecting the edge gateway, identifying, based on the gateway selection rules, a set of edge gateways in the plurality of edge gateways that are not qualified to perform the stateful service on data messages associated with the first logical network and (ii) selecting an edge gateway from the plurality of edge gateways excluding the set of edge gateways identified as not qualified.

12. The method of claim 1, wherein the data messages between the first logical network and the second network comprise (i) data messages sent by data compute nodes of the first logical network and (ii) data messages addressed to data compute nodes of the first logical network.

13. A non-transitory machine readable medium storing a program for execution by at least one processing unit and for configuring edge gateways for logical networks in a multi-tenant datacenter hosting a plurality of tenant logical networks, the program comprising sets of instructions for:
   identifying, for a particular tenant, at least one stateful service to perform on data messages between a first logical network of the particular tenant and at least a second other network;
   from a cluster of edge gateways, selecting an edge gateway to serve as the edge gateway to connect the first logical network to the second network, said selection based on an edge gateway selection rule from a set of gateway selection rules, the edge gateway selection rule comprising a set of one or more edge gateway selection criteria;
   configuring the selected edge gateway as a centralized routing component of a particular logical router for the particular tenant, the centralized routing component performing the stateful service on data messages between the first logical network and the second networks; and configuring the selected edge gateway and at least one forwarding element connected to a set of data compute nodes of the first logical network to implement a distributed routing component of the particular logical router.

14. The non-transitory machine readable medium of claim 13, wherein the centralized routing component is a service routing component of the particular logical router, while the distributed routing component is a routing component that forwards, to and from the service routing component, data messages entering and exiting the first logical network.

15. The non-transitory machine readable medium of claim 13, wherein the set of instructions for configuring the selected edge gateway to implement the distributed routing component of the particular logical router comprises a set of instructions for configuring a forwarding element executing on the selected edge gateway to implement the distributed routing component.

16. The non-transitory machine readable medium of claim 13, wherein the selected edge gateway is an active, first edge gateway, the program further comprising sets of instructions for:

selecting a second edge gateway to serve as a standby edge gateway to connect the first logical network to the second network and to perform the stateful service on data messages between the first logical network and the second networks; and configuring the standby, second edge gateway as a standby centralized routing component of the particular logical router to perform the stateful service on data messages between the first logical network and the second network when the first edge gateway is unavailable.

17. The non-transitory machine readable medium of claim 13, wherein the selected edge gateway is a first edge gateway, the particular tenant is a first tenant, the particular logical router is a first logical router, the stateful service is a first stateful service, and the first logical network is a first tenant logical network, the program further comprising sets of instructions for:

identifying, for a second tenant, a second stateful service to perform on data messages between a second logical network of the second tenant and the second network;

selecting the first edge gateway to serve as a standby edge gateway to connect the second tenant logical network of the second tenant to the second network and to perform the second stateful service on data messages between the second tenant logical network and the second network; and configuring the first edge gateway as a standby centralized routing component of the second logical router to perform the second service on data messages between the second tenant logical network and the second network when a second edge gateway configured to perform the second stateful service on data messages between the second tenant logical network and the second network is unavailable.

18. The non-transitory machine readable medium of claim 13, wherein the program further comprises a set of instructions for receiving a configuration policy comprising the set of gateway selection rules defined by an administrator of the particular tenant.

19. The non-transitory machine readable medium of claim 13, wherein the data messages between the first logical network and the second network comprise (i) data messages sent by data compute nodes of the first logical network and (ii) data messages addressed to data compute nodes of the first logical network.

* * * * *